Sept. 29, 1970     E. E. HAMILTON ET AL     3,531,718
STATION FOR TESTING VARIOUS ELECTRONIC DEVICES
Filed Dec. 7, 1965     11 Sheets-Sheet 1
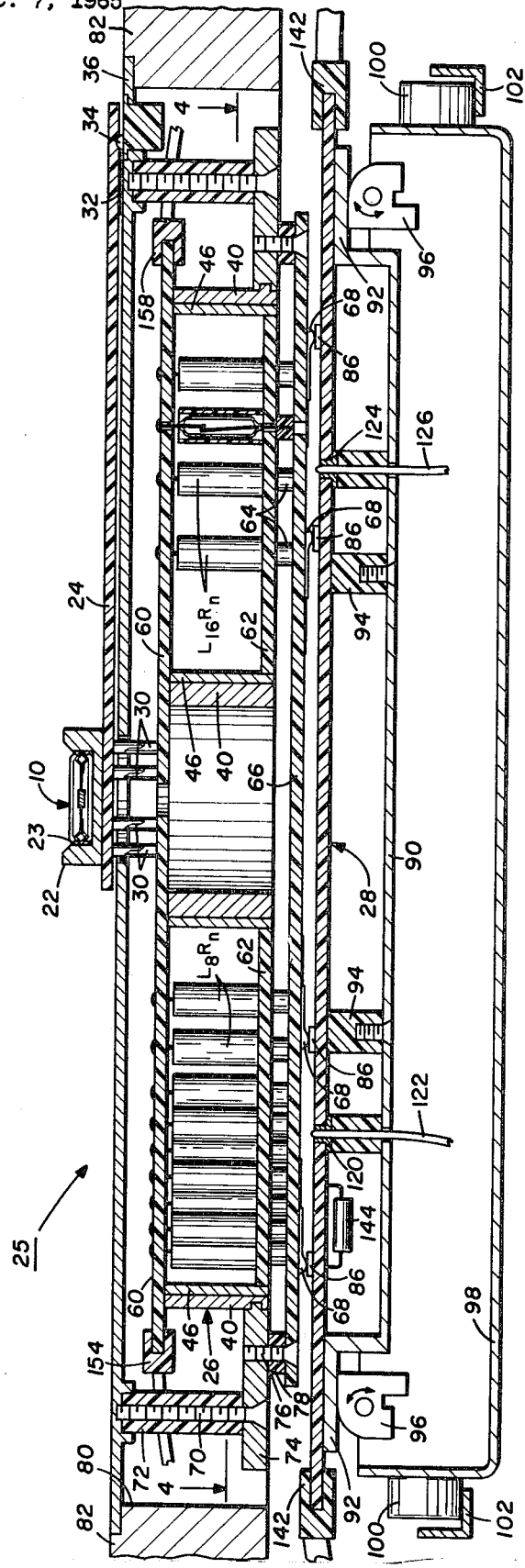
INVENTORS:
EDWARD E. HAMILTON, ET. AL.
E. Mickey Hubbard
ATTORNEY

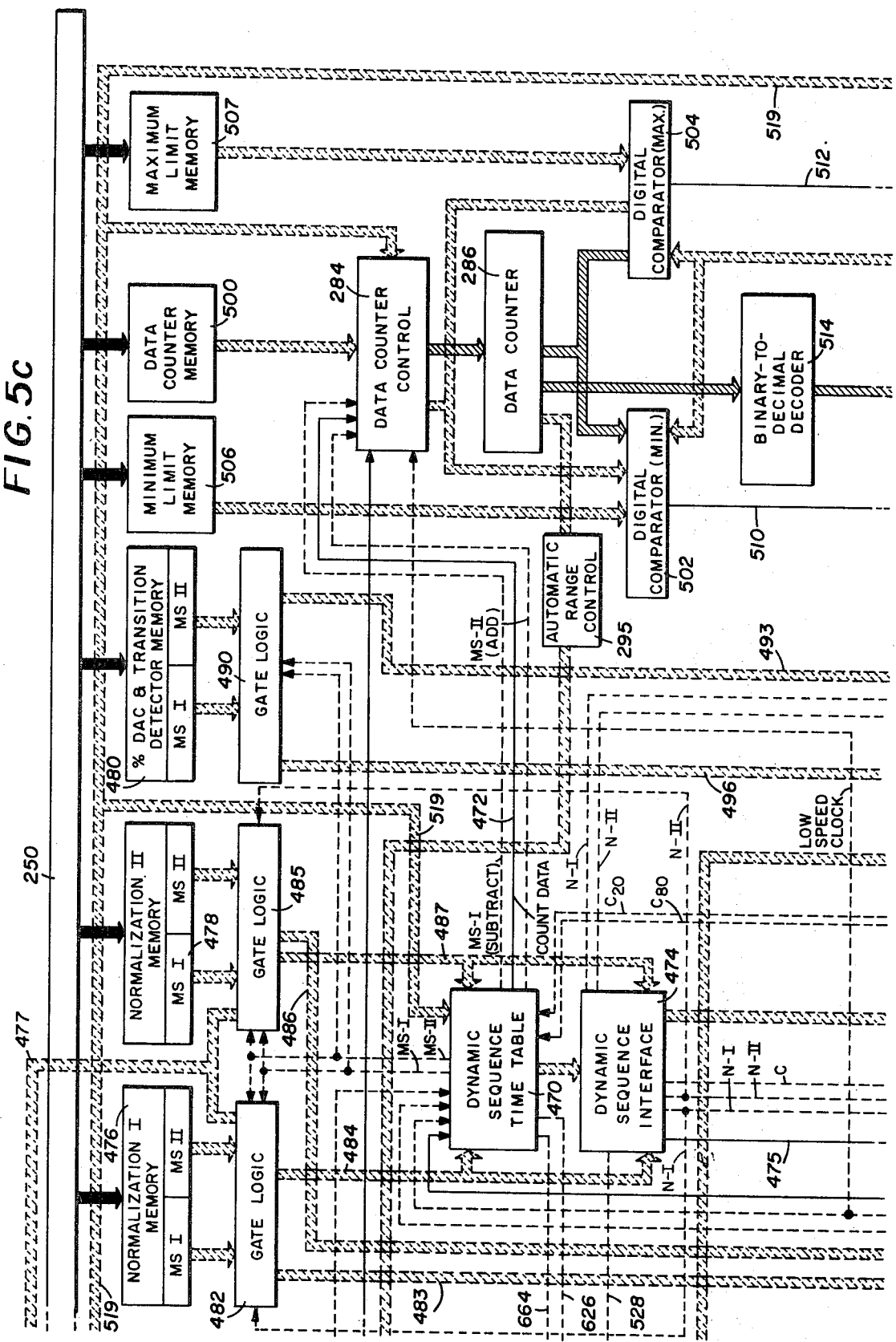

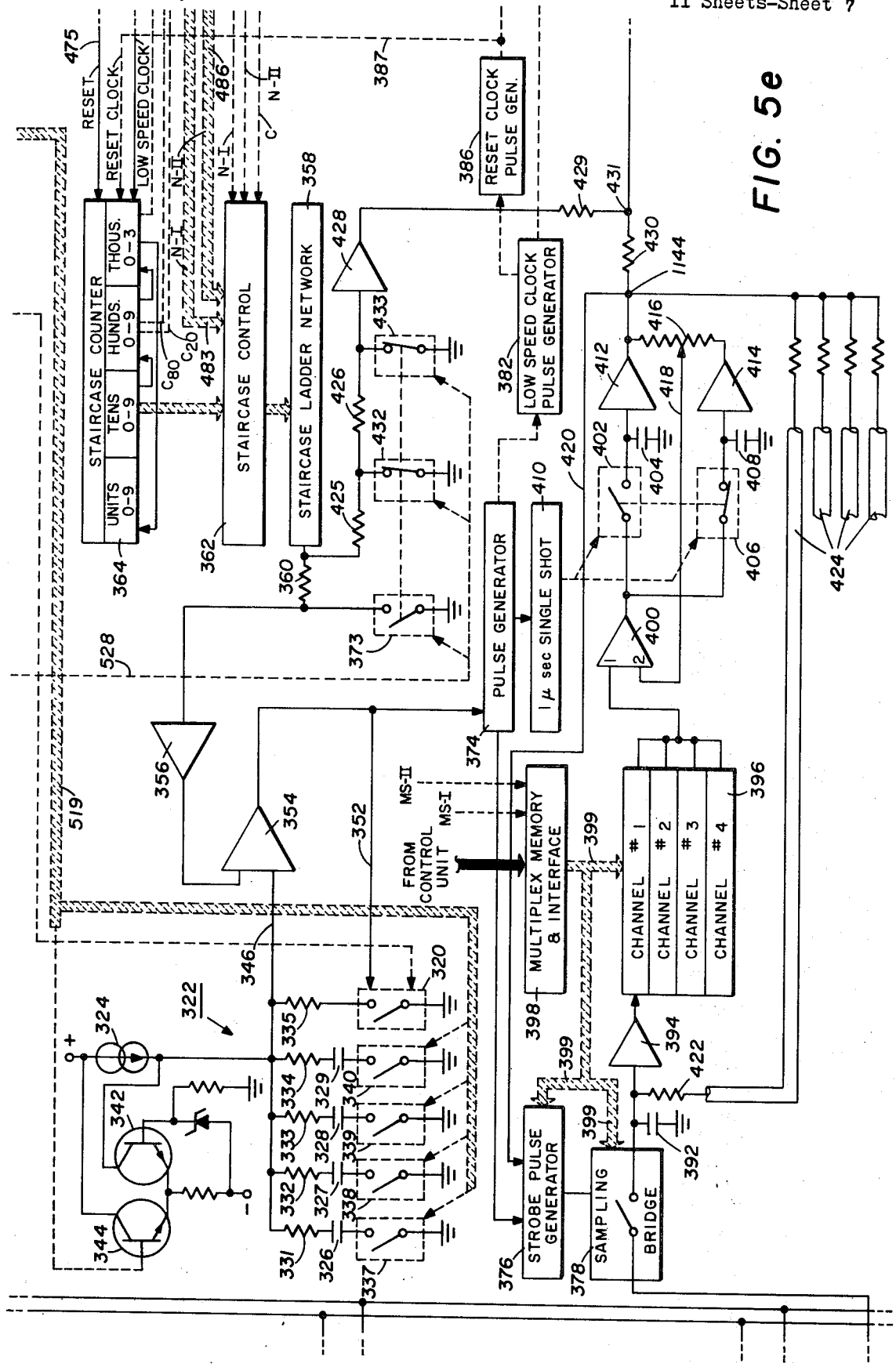

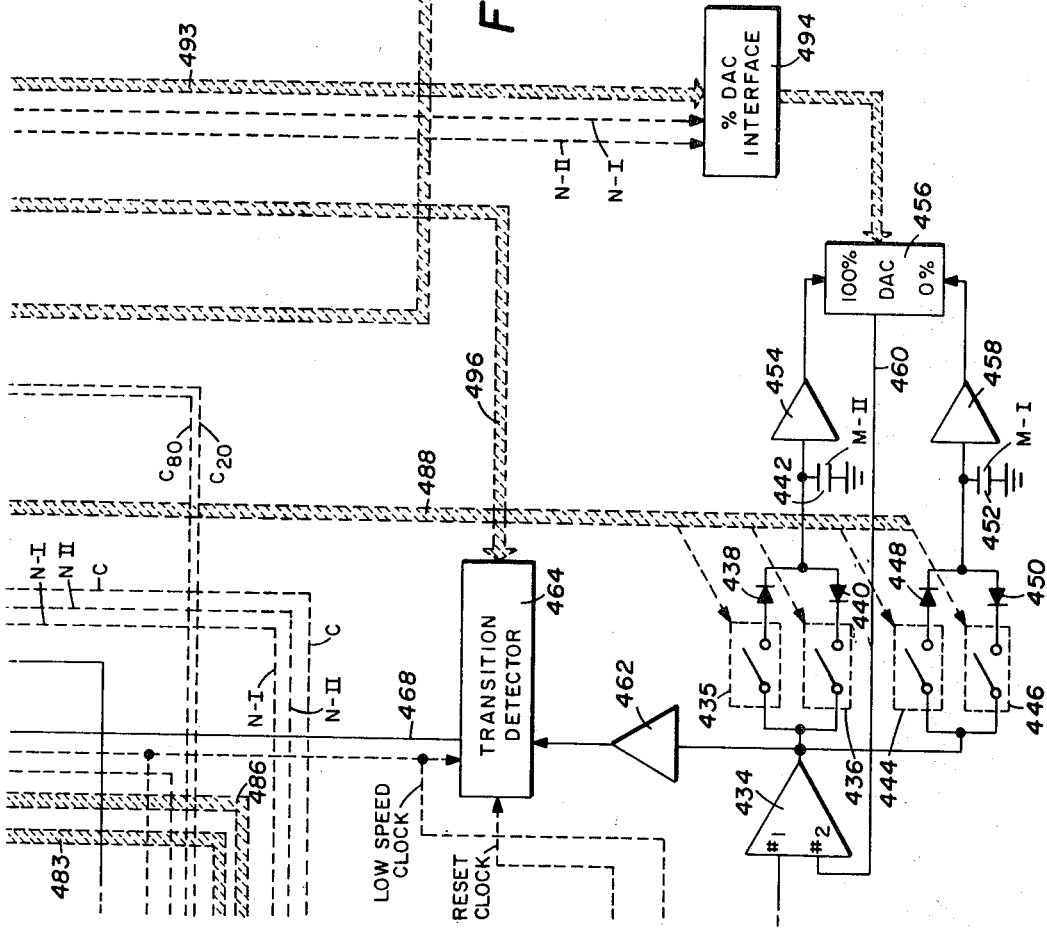

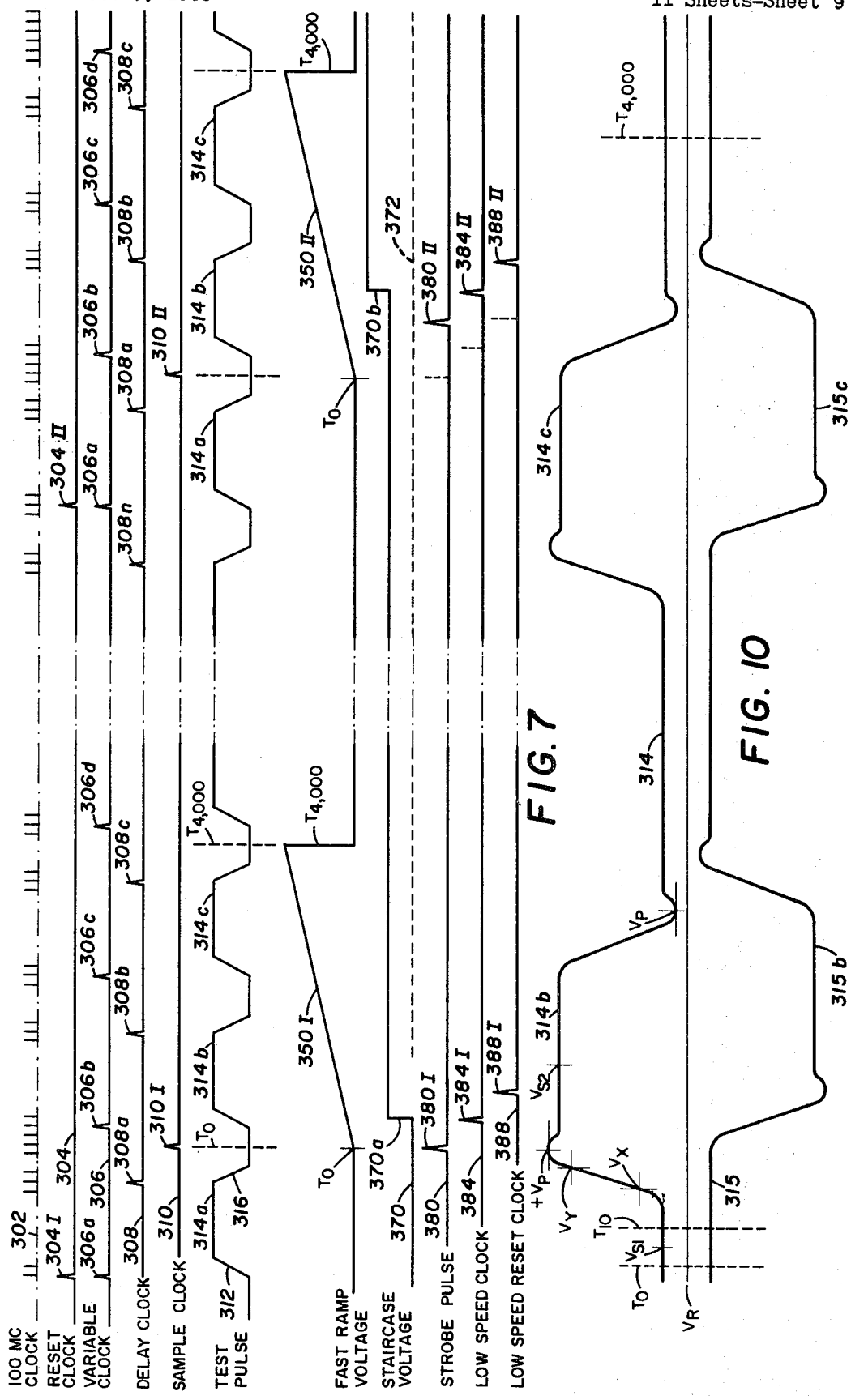

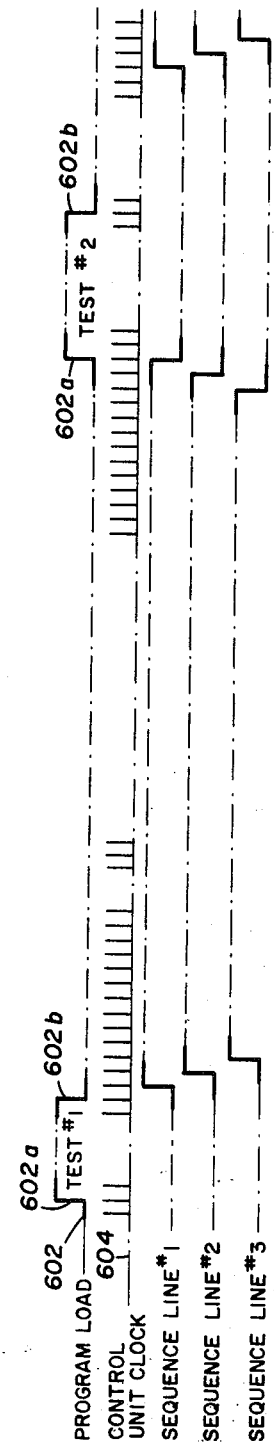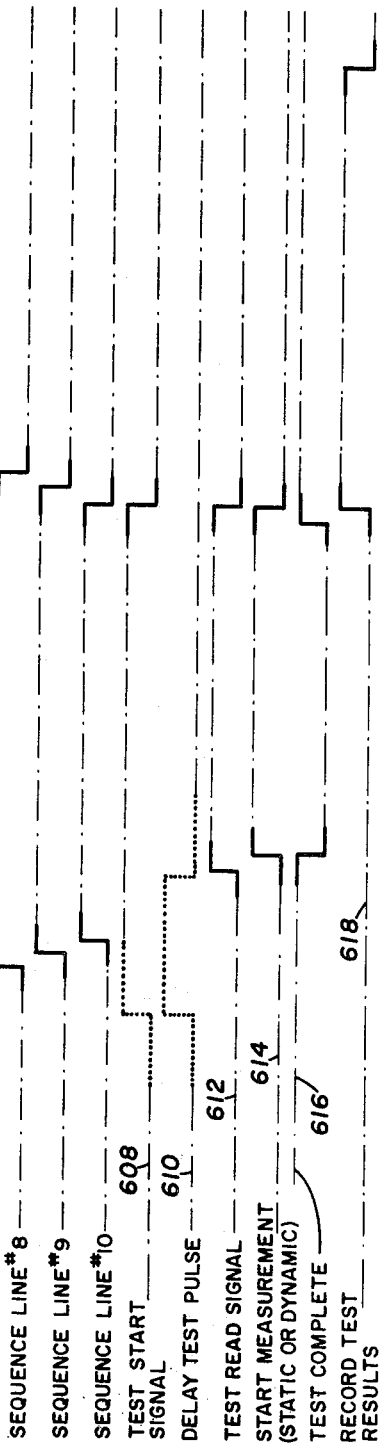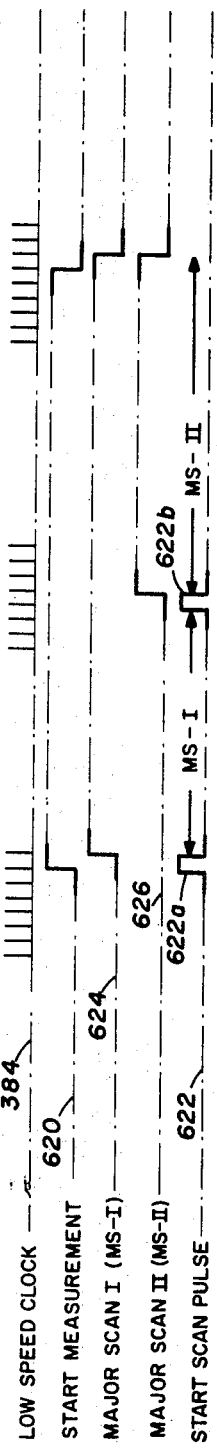
FIG. 8
FIG. 9

United States Patent Office 3,531,718
Patented Sept. 29, 1970

3,531,718
STATION FOR TESTING VARIOUS
ELECTRONIC DEVICES
Edward E. Hamilton, Janos J. Lazar, and Leslie L. Jasper,
Houston, Tex., assignors to Texas Instruments Incorporated, Dallas, Tex., a corporation of Delaware
Filed Dec. 7, 1965, Ser. No. 512,080
Int. Cl. G01r 15/12
U.S. Cl. 324—73       3 Claims

ABSTRACT OF THE DISCLOSURE

A system for automatically making substantially any static or dynamic test on a multilead integrated circuit. The system includes a test station having a plurality of D.C. bias supplies, a plurality of pulse generators for producing repetitive pulse waveforms, a socket for receiving the integrated circuit, switch means for selectively connecting any D.C. bias supply and/or any pulse generator to any lead or leads of the integrated circuit, and sensing means for selectively connecting any lead of the integrated circuit to either a static measuring unit or a dynamic measuring unit. The dynamic measuring unit makes either time or amplitude measurements on the signal at any lead of the integrated circuit and produces a pulse train and a count data signal which are collectively representative of the magnitude of the time or amplitude measurement. The static measuring unit makes either static voltage or current measurements on the signal at any selected lead of the integrated circuit and produces a pulse train signal the frequency of which is representative of the magnitude of the measurement. A data readout system counts the pulses either from the dynamic measuring unit during the count data signal, or the pulses from the static measuring unit during a predetermined reference time period to indicate the results of the measurement. A programmable control means automatically operates the total system to make substantially any selected amplitude, time, voltage or current measurement on the signal occurring at or between substantially any lead or leads of the integrated circuit.

---

This invention relates generally to measuring and testing, and more particularly relates to a test station for making voltage, current and time measurements which relate to the operation of electronic components and circuits.

During and after the manufacture of electronic components such as diodes, transistors and integrated circuits, it is common practice for either or both the supplier and the ultimate user to make various tests in order to determine the operability and characteristic parameters of the devices. For example, various parameter tests must be made on discrete semiconductor devices so that the devices can be classified for particular uses in circuits designed by mathematical formulas. On the other hand, the parameter information of each component is virtually unobtainable in integrated circuits where a large number of components are formed "in situ" on a single semiconductor wafer, and even if obtainable, would be of comparatively little value. This necessitates testing the entire integrated network in order to obtain the necessary design parameters and to test the operability of the network.

All tests performed on semiconductor devices can be broken down into two broad categories. The first, generally referred to as "static" testing, involves the application of stimuli and measurement of responses which are completely or essentially D.C. in nature and do not take into consideration either time or frequency ratings of the device under test. The other, referred to as "dynamic" testing, involves the application of both D.C. bias and a pulse stimuli which periodically varies to closely approximate the conditions under which the device will operate and the measurement of the responses from the stimuli. For example, the propagation delays of integrated logic circuits specified for 10 megacycle operation should be measured at a 10 megacycle repetition rate to properly consider R-L-C time constants and stored charge effects in the active devices.

Both component and integrated circuit testing has heretofore centered primarily around static measurements. Dynamic measurements have been made only in certain preselected areas using specially designed test equipment. Comprehensive testing of integrated circuit devices is greatly complicated in that such devices may have a large number of leads, fourteen to twenty being a very common number based on current technology. Further, a typical integrated circuit may require from twenty-five to fifty separate measurements or tests with each test perhaps being performed using different bias levels, amplitudes, and pulse widths applied to different leads. Because of the large number of tests which must be made on a large number of network devices, the test methods and systems heretofore available made comprehensive testing impractical.

In copending U.S. application S.N. 482,449 filed Aug. 25, 1965, by John H. Alford et al. now Pat. No. 3,418,573 and continuation-in-part application S.N. 512,109, filed Dec. 7, 1965, by John H. Alford et al., now Pat. No. 3,423,677, a method and apparatus for comprehensive testing of nonlinear logic circuits, parameter testing of discrete components, and certain functional testing of analog circuits was described. For example, the method and apparatus may be used to test such components and circuits as AND, OR, NAND, NOR, flip-flops, inverters, logic drivers, differential amplifiers, operational amplifiers, linear amplifiers, printed circuit logic cards, logic modules, diodes, transistors, and resistors. These devices may be tested for delay time, rise time, storage time, fall time, propagation delay, propagation difference, average delay, commutating time, feedthrough, overshoot, undershoot, period, pulse width, peak amplitude, amplitude, logic levels, noise thresholds, set-reset sensitivity, balance, offset voltage, output level, D.C. gain, step response (band width), leakage, brakedown voltage, reverse recovery, droop, as well as the more conventional static voltage and current measurements.

This invention is concerned with a test station suitable for use in such a test system. In order to provide a universal test system capable of making test measurements on substantially any electronic device, the system must be readily adaptable to receive any device regardless of the number or arrangement of leads with a minimum expenditure of time and money. The capability to perform a large number of tests in a minimum amount of time requires, as a practical matter, that all the tests be performed while the device is in a single test socket. Further, in order to make all of the measurements necessary to test and classify a particular device, a large number of D.C. bias levels must be applied to various leads of the device, and these bias levels usually will vary in magnitude from test to test and from lead to lead on the same device. In dynamic testing, it may be necessary to apply a pulse to, and also to measure the response on, several different leads, and the leads may vary from one type of device to the next. These objectives are very much complicated if the test specimen is to be tested at high frequencies because a complex of relays inherently cause dislocation of the waveform, propagation delays, stray capacitance, series inductance, voltage drops and cross talk.

Accordingly, an important object of this invention is to provide a test station for a system for making substantially all voltage, current and time measurements necessary to test and classify substantially any electronic device or circuit.

Another object is to provide a test station for a system which may be programmed to perform such current, voltage and time measurements automatically and at a high rate of speed with minimum setup time and cost.

A further object is to provide such a test station for a system which will perform a large number of different tests in a short period of time.

Another object is to provide such a test station for a system which will make amplitude and time measurements on waveforms repeating at rates as high as 50 megacycles.

Another important object is to provide a test station which will sequentially perform a large variety of static and dynamic tests on different leads of a multilead device, such as an integrated circuit or the like, without removing the device from the test socket.

A further object is to provide a test station which can be quickly and easily adapted to test different devices having different multilead configurations.

Another object is to provide a test station wherein the bias voltages and pulse stimuli may be selectively applied to any lead of a multilead device.

Another very important object of the invention is to provide a test station for making either static or dynamic voltage measurements between any two leads of a multilead device or between any lead and ground.

A further object is to provide such a test station wherein current measurements can be made with respect to any lead of a multilead device under either static or dynamic conditions.

Still another object is to provide a test station which can easily be adapted to test substantially any device or circuit.

A further object of the invention is to provide a test station for making any one of the large number of measurements at any selected device lead, or between any two device leads.

A further object of the invention is to provide a test station wherein the order in which a plurality of bias voltages and pulse stimuli are applied to and removed from a device being tested may be programmed.

Another object is to provide a test station wherein any load may be inserted in any device stimulus circuit.

Still another very important object of the invention is to provide a test station by which successive measurements can be made by a single sensing probe at the same or different device leads and these measurements compared to provide a differential measurement.

These and other objects are accomplished by means of a test station including a socket means for receiving an electronic test specimen, a D.C. bias supply, switching means for selectively connecting the D.C. bias supply to selected leads of the electronic test specimen, a pulse generator, switching means for selectively connecting the pulse generator to selected leads of the electronic test specimen, a static output, sensing means for selectively connecting the static output to selected leads of the electronic test specimen, a dynamic output, and sensing means for selectively connecting the dynamic output to selected leads of the electronic test specimen.

More particularly, the invention contemplates a test station wherein there are a plurality of power buses and a plurality of sense buses, each power bus being connectable through the socket means to a lead of the electronic test specimen and each sense bus also being connectable by the socket means to a lead of the electronic test specimen, a plurality of power terminals for each power bus, relay means for selectively connecting each of the power terminals to the respective power bus, a D.C. bias terminal connectable to a D.C. bias supply, a dynamic stimulus terminal connectable to the output of a pulse generator, a dynamic output, relay means for selectively connecting each of the sense buses to the dynamic output of the test station, a static output, and relay means for selectively connecting each of the sense buses to the static output of the test station. This configuration permits one or more of the power terminals to be selectively connected to the D.C. bias terminal or to the dynamic stimulus terminal by means of a jumper wire or a load such that the electronic test specimen may be tested under selected operating conditions.

In accordance with another specific aspect of the invention, the test station is comprised of a relay assembly having a plurality of power buses each connected to a connector half of a first set of connector halves on the relay assembly, and a plurality of relays connected to each power bus, each relay being also connected to a connector half of a second set of connector halves on the relay assembly. A socket means for receiving a multilead electronic test specimen has a circuit means connectable between each of a plurality of leads of the specimen and a connector half of a third set of connector halves arrayed and adapted to mate with the connector halves of the first set of connector halves so as to complete an electrical circuit between each power bus and a lead of the test specimen. A performance board is provided having a power terminal means formed thereon for each of said relay means, each of said power terminal means being electrically connected to a connector half of a fourth set of connector halves on the performance board which are adapted to mate with the second set of connector halves. A plurality of input terminal means are also provided on the performance board each connected to a connector half of a fifth set of connector halves so that the input terminals and the output terminals may be selectively interconnected by jumper wires and loads to test a particular test specimen under various bias and load conditions.

The novel features believed characteristic of this invention are set forth in the appended claims. The invention itself, however, as well as other objects and advantages thereof, may best be understood by reference to the following detailed description of illustrative embodiments, when read in conjunction with the accompanying drawings, wherein:

FIG. 1 is a plan view of a typical electronic device, mounted on a plastic carrier frame, of the type which may be tested by the system of the present invention;

FIG. 3 is a somewhat schematic sectional view of the test station of FIG. 2 taken substantially on lines 3—3 of FIG. 4;

FIGS. 5a–5f are schematic block diagrams which collectively disclose the system of the present invention;

FIG. 6 is a schematic drawing illustrating the manner in which FIGS. 5a–5f should be arranged so that the lines extending between sheets will register and provide a composite diagram;

FIG. 7 is a timing diagram which illustrates the operation of the digital synchronization unit of the system and the derivation of the sample pulse and the low speed logic clock;

FIG. 8 is a timing diagram for the system of FIGS. 5a–5f;

FIG. 9 is a timing diagram illustrating the automatic sequence for a dynamic measurement;

FIG. 10 is a timing diagram illustrating a pair of typical repetitive waveforms which may be measured by the method and system of this invention;

Figure 4:
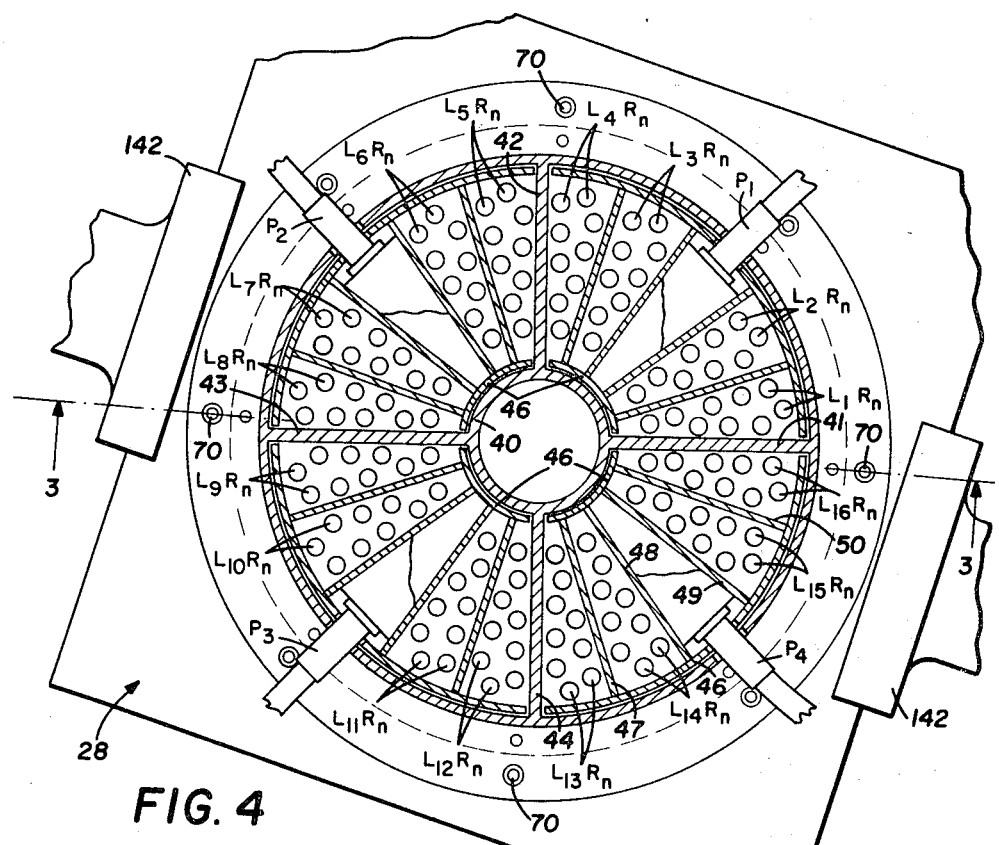
FIG. 4 is a somewhat schematic sectional view taken substantially on lines 4—4 of FIG. 3.

Referring now to the drawings, a typical integrated circuit component which may be tested by the system of the present invention is indicated generally by the reference numeral 10 in FIG. 1. The device 10 is comprised of a flat package 12 in which the semiconductor wafer is located. Sixteen leads 14 extend from the flat pack and are crimped around the ribs 16 and 18 of a plastic frame 20 which facilitates handling, testing and shipment of the device. Although the device 10 is illustrated as having sixteen leads, and the system illustrated has a capacity of handling only sixteen leads for dynamic testing, it is to be understood that within the broader aspects of the invention a device having substantially any number of leads may be tested by proper modification of the test station and system.

The device 10 is received in a test socket 22 of a high frequency test station indicated generally by the reference numeral 25. The test station 25 is comprised of the socket board 24 and socket 22, a relay unit 26, and a performance board 28.

The test socket 22 has a number of leaf spring contacts 23 each of which engages and makes electrical contact with each of the device leads 14. The socket 22 is mounted on a printed circuit socket board 24 which is plugged into the relay unit 26 by connectors 30. Suitable printed circuits formed on the socket board 24 electrically connect the leaf spring contacts 23 and the respective connectors 30. The socket 22 and socket board 24 are specially designed for each different type of device being tested. To insure that the proper test socket is being used for a particular test, an identification code is formed by a printed circuit (represented schematically at 32) on the socket board 24 and this code is fed out through contacts 34, which are mounted on a plate 36, to a control unit which will hereafter be described.

The relay unit 26 has nine high frequency relays $R_1$ through $R_9$ for each of the sixteen device leads $L_1$ through $L_{16}$. Thus the nine relays for lead $L_1$ are designated $L_1R_1$ through $L_1R_9$, etc. Each relay $L_nR_n$ is comprised of a glass encapsulated reed switch which is controlled by a coil wound around the glass capsule. The relays $L_nR_n$ are mounted in a circular housing 40 which is divided into four quadrants by radial partitions 41, 42, 43 and 44. Each quadrants, for example the quadrant between radial partitions 44 and 41, is divided into five segments by an insert 46 having radial partitions 47, 48, 49 and 50. Four upper printed circuit boards 60 overlay the top of each quadrant and four lower printed circuit boards 62 form the bottom of each quadrant. Each of the relays $L_nR_n$ is mounted between the upper and lower printed circuit boards with the relays structurally interconnecting the boards. This construction permits each of the segments to be merely dropped into the quarter segments of the circular housing 40 and hang suspended from the upper boards 60. The lead wire extending from the lower end of each of the relays $L_nR_n$ protrudes through the respective lower printed circuit board 62 and into female connector 64 on a printed circuit adapter board 66. The adapter board 66 has leaf spring contacts 68 on its under surface which are electrically connected to the various female connectors 64 by printed circuits on the adapter board 66. The spring contacts 68 are conveniently arranged in two concentric circles.

The circular housing 40 is keyed into a ring 74, and the adapter board 66 is connected to the ring 74 by peripherally spaced screws 76 and standoffs 78. The entire relay unit 26 is received in an opening 80 cut in a tabletop 82 and is suspended from the upper plate 36 by screws 70 which extend through the ring 74 and standoffs 72 and are connected to a plate 36. The plate 36 rests on the tabletop around the periphery of the opening 80.

The performance board 28 has a large number of button contacts 86 which are arranged in two concentric circles and spaced to engage the spring contacts 68 on the lower surface of the adapter board 66. As will hereafter be described in greater detail, the performance board 28 is customized for each different type device 10 being tested and accordingly is made easily removable. This is accomplished by resting the performance board 28 on a tray 90 having a peripheral lip 92 and pedestal supports 94, together with suitable aligning means (not illustrated). The tray 90 is supported by suitable camming means represented schematically at 96 which are carried by a drawer 98. The drawer has rollers 100 which ride on tracks 102 which are secured to the desk top 82 or other support means. When the camming means 96 are rotated, the tray 90 and performance board 28 are lowered from the adapter board 66 so that the drawer may be pulled out and the performance board replaced. The electrical connections of the test station 25 are hereafter described in connection with FIG. 5d.

Figure 5A:
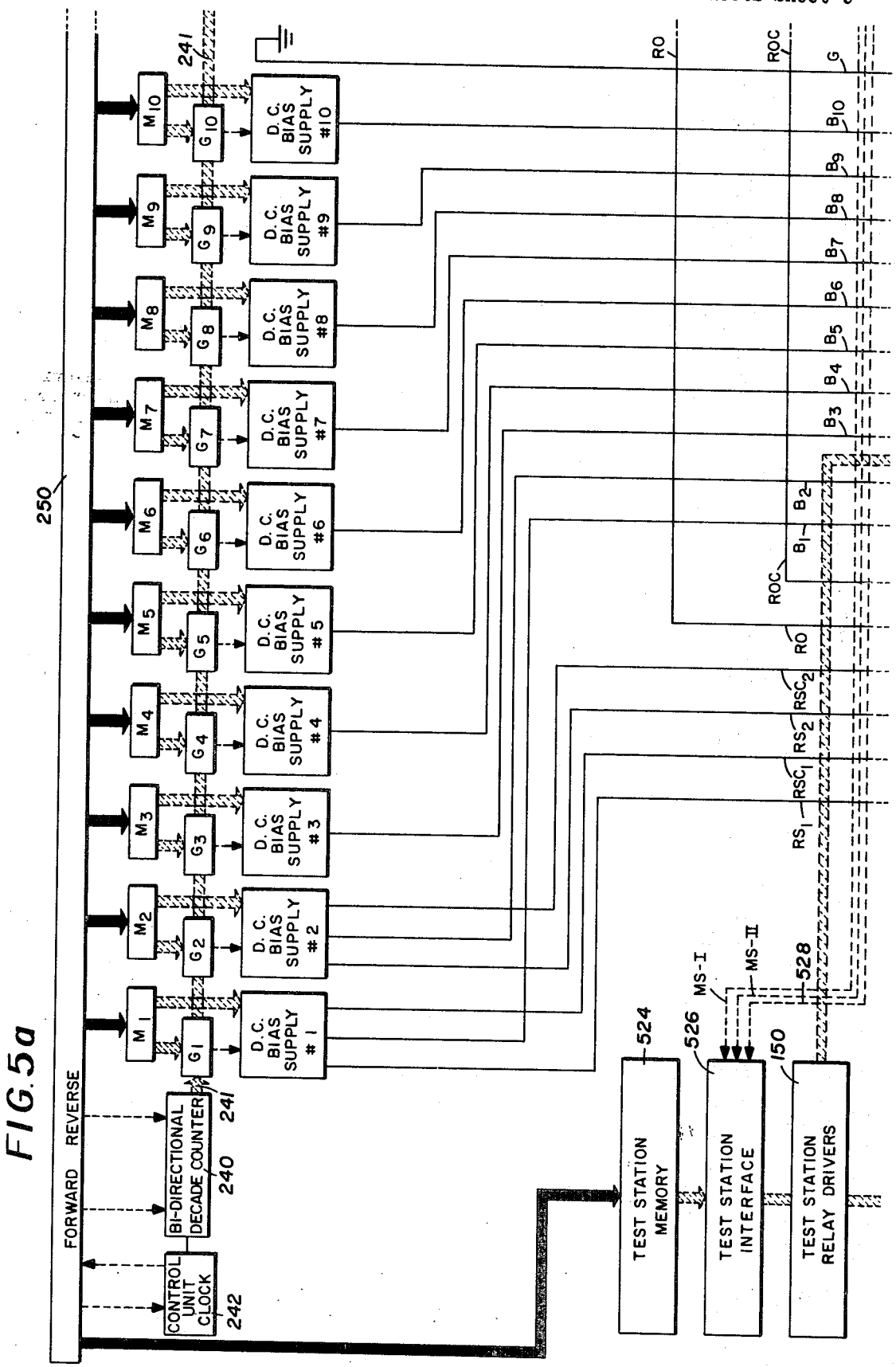
Figure 5B:
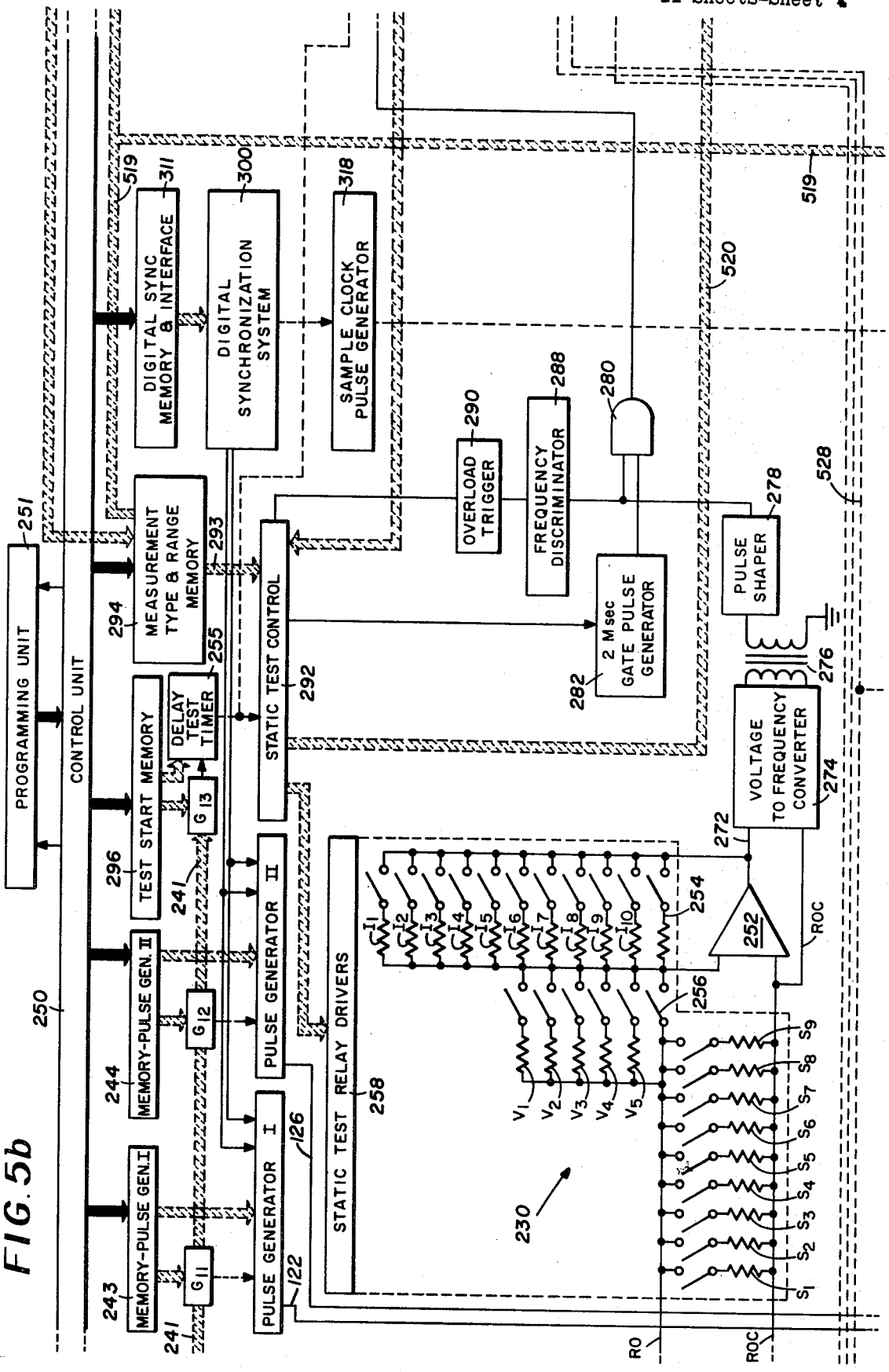
Figure 5D:
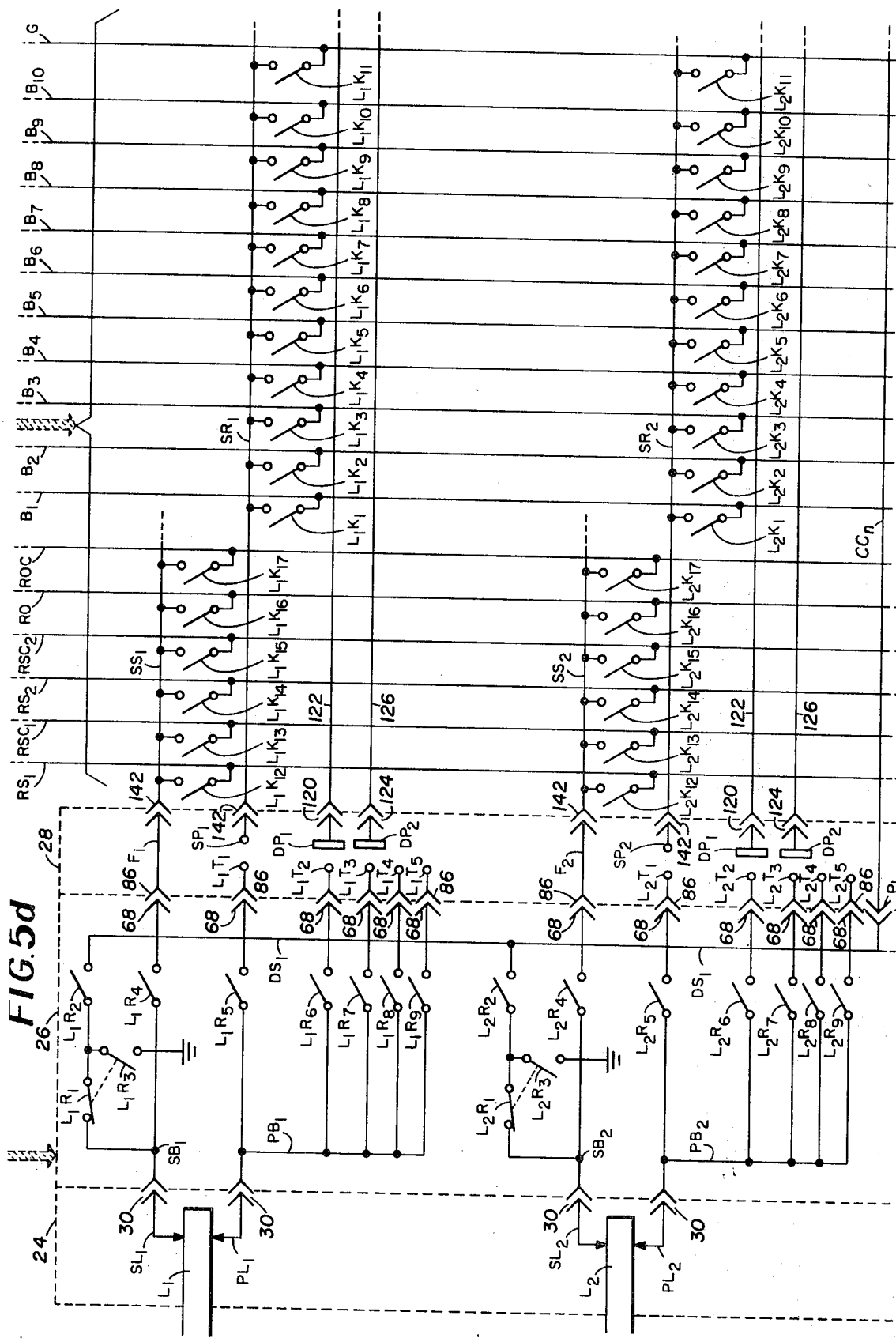

Referring now to FIGS. 5a–5f, and in particular to FIG. 5d, two leads of the device under test are illustrated schematically and designated by the reference characters $L_1$ and $L_2$. It should be noted that the device leads $L_3$–$L_{16}$, as well as the components associated with device leads $L_3$–$L_{16}$, are not illustrated in FIG. 5d, but are mentioned merely to assist in understanding the test station. The socket board 24 has power leads $PL_1$–$PL_{16}$ which are electrically connected to the device leads $L_1$–$L_{16}$ and to power buses $PB_1$–$PB_{16}$ on the upper printed circuit board 60 by the connectors 30. The power buses $PB_1$–$PB_{16}$ are connected through relays $L_nR_5$–$L_nR_9$ to the leaf spring contacts 68 on the adapter board 66. The buttons 86 on the performance board 28 which mate with the contacts 68 are connected to power terminals $L_nT_1$–$L_nT_5$.

Kelvin type sense leads $SL_1$–$SL_{16}$ on the socket board 24 are each connected by one of the connectors 30 to sense buses $SB_1$–$SB_{16}$. D.C. sensing measurements are made through relay $L_1R_4$, and the conductor comprised of a spring contact 68 and button contact 86 on the performance board 28. In most cases, a direct feed-through conductor $F_1$–$F_{16}$ will be formed on the performance board to connect the button 86 to a connector 142 presently to be described, and finally to a static sense bus $SS_n$ for each lead. Dynamic sensing is provided through relays $L_nR_1$ and $L_nR_2$ to dynamic sense buses $DS_1$–$DS_4$, each of which may be conveniently located on either the upper or lower printed circuit boards 60 or 62 of each quadrant to interconnect the four relays $L_nR_2$ in that quadrant. For example, relays $L_1R_2$–$L_4R_2$ would be conected to dynamic sense bus $DS_1$. Similarly, the groups of relays $L_5R_2$–$L_8R_2$, $L_9R_2$–$L_{12}R_2$, and $L_{13}R_2$–$L_{16}R_2$ would be connected to dynamic sense buses $DS_2$, $DS_3$ and $DS_4$, respectively, which are not illustrated. Four bayonet type probe connectors $P_1$–$P_4$ are then connected to the dynamic sense buses $DS_1$–$DS_4$, respectively. The probe connectors $P_1$–$P_4$ are physically passed through the wall of the circular housing 40 into a female receptacle disposed in the center segment of each of the four quadrants as can best be seen in FIG. 4.

Static bias supply terminals $SP_1$–$SP_{16}$ are formed on the performance board 28 for leads $L_1$–$L_{16}$, respectively. The sixteen straight through conductors $F_1$–$F_{16}$ are connected to static sense buses $SS_1$–$SS_{16}$ by multilead connectors 142 which may be seen at each edge of the performance board 28 in FIG. 3. A pair of dynamic stimuli buses $DP_1$ and $DP_2$ are provided on the performance board 28 and made available for connection to any one of the terminals $L_nT_1$–$L_nT_5$ at any one of the leads $L_1$–$L_{16}$ by means which will presently be described. The dynamic stimulus buses $DP_1$ and $DP_2$ on the performance board 28 may be circular in form and the terminals $L_nT_n$ arranged in a circle to facilitate connecting any of the terminals $L_nT_1$–$L_nT_5$ to either of the buses $DP_1$ or $DP_2$ by a jumper wire or load device as hereafter described. Bus $DP_1$ may be connected by a small connector 120 shown in FIG. 3 to a coaxial supply cable 122, and bus $DP_2$ may be connected by a like connector 124 to a coaxial supply cable 126. The function of the performance board 28 can best be understood after a description of the static power supplies and the dynamic pulse generators used to stimulate the device under test which will presently be described.

Figure 2:
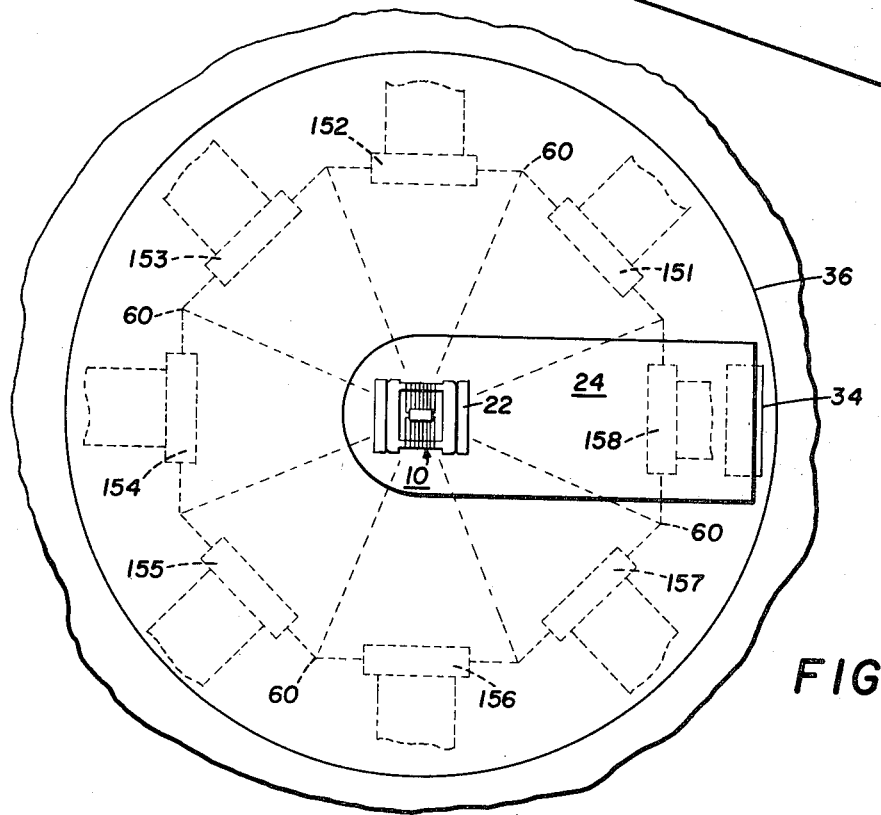
FIG. 2 is a plan view of the test station of the system of this invention.

Relays $L_nR_n$ are operated by current from a bank of controllable relay drivers 150. The leads from the drivers are coupled to the upper printed circuit board 60 by connectors 151–158 (see FIGS. 2 and 3). Each of the connectors 151–158 carries the conductors extending to the coils of the relays associated with the two device leads. For example, the connector 151 carries the relay driver leads to the coils of relays $L_1R_1$–$L_1R_9$ and relays $L_2R_1$–$L_2R_9$.

Ten D.C. bias supplies #1–#10 are connected to supply buses $B_1$–$B_{10}$, respectively. Each of the D.C. bias supplies is programable over a wide range with respect to both voltage and current, and when operating in the voltage mode has an automatic current limiting feature. These bias supplies are commercially available items. Each of the sixteen static relay buses $SR_1$–$SR_{16}$ may be selectively connected to any one of the buses $B_1$–$B_{10}$ by the bank of relays $L_nK_1$–$L_nK_{10}$ or to a ground bus G by relays $L_nK_{11}$ provided for each device lead. D.C. bias supplies #1 and #2 have remote sense lines $RS_1$ and $RS_2$, and remote sense common lines $RSC_1$ and $RSC_2$ each of which may be selectively connected to any of the static sense buses $SS_1$–$SS_{16}$ by relays $L_nK_{12}$, $L_nK_{14}$, $L_nK_{13}$ and $L_nK_{15}$, respectively. The two remote sense leads for each of these bias supplies permit the sensing of either positive or negative voltages for reference purposes in the supplies. A pair of readout lines RO and ROC may also be individually connected to any one of the static sense lines by relays $L_nK_{16}$ and $L_nK_{17}$, respectively. The readout lines RO and ROC are the inputs to the static measurement subsystem 230 which will hereafter be described in greater detail. The coaxial cables 122 and 126 are connected to pulse generators I and II shown in FIG. 5b which produce pulse stimuli of a selected frequency, amplitude and width as hereafter described in greater detail.

The function of the performance board 28 will now be described. In a sequence of measurements or tests for a multilead device, it will often be necessary to apply D.C. bias levels to one or more of the device leads $L_1$–$L_{16}$ and to apply a pulse stimulus to others of the device leads. During a sequence of perhaps twenty-five tests to be performed on a single device, these bias levels and pulse stimuli will usually change in character and will usually be applied to different leads. In order to more nearly simulate the actual operating conditions, it will usually be necessary to connect some type of load in the bias or pulse stimuli circuit of the device, and the load value and character will often vary from test to test on a given device, and will nearly always vary for devices of different types. For this reason, the relay terminals $L_nT_2$–$L_nT_5$ and the static power terminals $SP_1$–$SP_{16}$ and dynamic power terminals $DP_1$ and $DP_2$ are oriented on the printed circuit board in close proximity. This provides great flexbility in that any terminal $L_nT_1$–$L_nT_5$ of each lead can be connected to any one of the supply buses $SP_1$, $DP_1$ or $DP_2$ either directly by a jumper wire or through an electronic component of the proper type and value, such as a resistor (indicated by the reference numeral 144 in FIG. 3), a capacitor or a resistor-capacitor network. This permits any device lead $L_n$ to be connected to any one of the ten D.C. bias supplies by connecting one of the terminals $L_nT_1$–$L_nT_5$ to the adjacent bus $SP_n$ and closing the corresponding switch $L_nK_n$. Then when the appropriate relay $L_nR_5$–$L_nR_9$ is closed during the proper test period, the lead will be connected to the selected power supply. Similarly, any one of the leads $L_1$–$L_{16}$ may be connected to either of the pulse generators I or II by wiring one of the terminals $L_nT_1$–$L_nT_5$ to the appropriate bus $DP_1$ or $DP_2$. As mentioned, this wiring may include a suitable electronic component selected to provide the desired circuit load. Any lead $L_1$–$L_{16}$ may be connected to ground, through a load if desired, by connecting one of the terminals $L_nT_1$–$L_nT_5$ to the adjacent bus $SP_n$ and closing the proper switch $L_nK_{11}$. The presence of the five terminals $L_nT_1$–$L_nT_5$ and controlling relays $L_nR_5$–$L_nR_9$ permits any one lead to be connected to the same power bus $SP_1$, $DP_1$ or $DP_2$ by different load components for different tests. Up to ten different D.C. bias leads may be used during any one time and any one bias supply may be connected to any number of device leads simultaneously. The provision of two pulse generators which are synchronously controlled as hereafter described permits the application of two related pulse trains to different terminals of the device.

Both static and dynamic sensing, as well as the remote sensing for D.C. bias supplies #1 and #2, are made through a Kelvin connection to the particular lead. Static measurements are made by closing relay $L_nR_4$ and opening relays $L_nR_2$ and $L_hR_3$ and closing the appropriate relay $L_nK_{16}$ or $L_nK_{17}$. Dynamic measurements are made by opening relay $L_nR_4$ and closing relays $L_nR_1$ and $L_nR_2$. The probes are grounded during the storage of a reference voltage in the dynamic measuring subsystem as will hereafter be described by opening relay $L_nR_1$ and closing relays $L_hR_2$ and $L_nR_3$. It should be noted that relays $L_nR_1$ and $L_nR_3$ are always operated in the alternative as represented by the interconnecting dotted line.

The time at which each of the D.C. bias supplies #1–#10 and the pulse generators I and II is activated may be programmed so that the bias voltages and pulse stimuli may be applied to the device under test in any desired sequence in order to protect the device. A bi-directional decade counter 240 sequentially energizes ten successive sequence lines 241 on ten successive pulses of the control unit clock 242. The ten sequence lines 241 extend to each of thirteen gate logic circuits $G_1$–$G_{13}$. Shift register memories $M_1$ through $M_{10}$ store program information for the D.C. bias supplies #1–#10, respectively. Each of the memories $M_1$–$M_{10}$ stores information concerning the type and level of bias to be supplied, whether the voltage is to be referenced based upon the voltage at the device lead or at the supply, the time at which the bias supply is to be acivtated, etc. Memories 243 and 244 store similar information for the pulse generators. An activate signal is gated to each respective bias supply and pulse generator by the respective gate logic systems $G_1$–$G_{12}$ when the logic level of the sequence line programmed for the particular supply or generator changes from "0" logic level to a "1" logic level.

SYSTEM OPERATING SEQUENCE

The operating sequence of the system may be best understood by reference to the timing diagram of FIG. 8. The entire system is operated by the control unit 250. One of the principal functions of the control unit 250 is to route the program information from the programming unit 251 to the various shift register memories of the system which have been or will be described. Operation of the control unit 250 is synchronized by the control unit clock 242, the output of which is indicated by the time line 604. After operation of the system is initiated from the control unit 250, all program information for test No. 1 is routed into and stored in the respective memories during the period starting at 602a and ending at 602b.

The programming unit 251 may be of any conventional type, such as magnetic, punched card, punched tape, or computer, so that a sequence of different tests, including major scans I and II for a dynamic measurement, or a static measurement, can be easily repeated for successive test devices. As mentioned, the control unit 250 starts and stops the program unit 251 and routes the information from the programming unit to the appropriate memory as a result of a coded address at the beginning of each set of program information to be put in a particular register. Since all memories are shift registers, the memory must be completely filled in order to place the information in the proper bits of the shift register. The programming unit is automatically stopped after each test has been programmed by a stop signal in the program. The use of addressable shift register memories saves a considerable amount of programming time because for each succeeding test, only the registers in which a test condition is to be changed need be reprogrammed.

After the programming has been completed, as indicated by a signal from the programming unit to the control unit, the bi-directional decade counter 240 is activated to count the control unit clock pulses 604 in the forward direction and sequentially bring the ten sequence lines #1–#10 (which are indicated collectively by the reference numeral 241 in FIG. 5a) up to a logic "1" level as indicated by the time lines in FIG. 8. As previously described, any one of the D.C. bias supplies #1–#10 or the pulse generators I and II may be activated by a signal gated through the logic gate circuits $G_1$–$G_{12}$, respectively, by one of the sequence lines and a program line from the respective memories $M_1$–$M_{10}$, 243 and 244. In the same manner, any one of the ten sequence lines together with a program line from a test start memory 296 may gate a test start signal represented by the time line 608 from the logic gate circuit $G_{13}$ to a delay test timer 255. The delay test timer produces a delay test pulse represented by the time line 610 upon receipt of the test start signal 608. The delay test pulse 610 continues for a time determined by program information from the test start memory 296 to permit the device under test to stabilize. After the delay test pulse 610, a test read signal represented by the time line 612 is sent to the static test control 292 and to the dynamic sequence timetable 470 which will hereafter be described. A start measurement signal 614 is then generated in both the static and dynamic measuring subsystems to initiate automatic operation of each of the subsystems in accordance with the program instructions.

Upon the completion of the static or dynamic measurement, a test complete signal 616 is sent back to the control unit 250 which generates a record test results signal 618, reverses the bi-directional counter 240, and starts rippling down the sequence lines #1–#10 in reverse order, and also terminates the test start signal 608, terminates the test read signal 612, and terminates the start measurement signal 614. As soon as sequence line #1 has returned to "0" logic level, the program load signal 602 is sent to the programming unit 251 and the program information for test No. 2 is fed into the shift register memories. Upon completion of the programming for test No. 2 as indicated by the fall 602 of the program load signal, or the termination of the recordation of the data from test No 1, as determined by the fall of the record test result signal 618, the sequence lines #1–#10 are again rippled up and the second test proceeds in the same manner.

STATIC MEASUREMENT SUBSYSTEM

The readout lines RO and ROC are connected to the inputs of a static measuring subsystem indicated generally by the reference numeral 230. The subsystem includes a differential, operational amplifier 252 which is used to make both voltage and current measurements between the two lines RO and ROC. The readout common line ROC is always connected to one input of the amplifier 252. The readout line RO is connectable through one of five attenuating resistor-relay branches $V_1$–$V_5$ to make voltage measurements in different ranges, since the resistor values in the branches are different to provide different degrees of attenuation. A resistor-relay branch 254 is also closed to provide a feedback loop for the amplifier of a standard resistance value for all voltage measurements. For current measurements, one of nine resistor-relay branches $S_1$–$S_9$ is first closed across the input leads RO and ROC and the voltage drop across the branch measured by closing one of branches $V_1$–$V_5$, depending on the range, for a brief sample period during which the voltage drop across $S_1$–$S_9$ is sampled to determine whether or not the current to be measured is of such a magnitude as to drive the amplifier 252 into hard saturation. If not, the closed resistor-relay branch $S_n$, the closed branch $V_n$, and relay 254 are opened, and the relay 256 is closed and one of the resistor-relay branches $I_1$–$I_{10}$ is closed in the feedback loop of the amplifier 252 to provide a direct current measurement. The current measurement range is selected by the different values of the resistors in branches $I_1$–$I_{10}$. The resistance values of the branches $S_1$–$S_9$ correspond to the ranges produced by branches $I_1$–$I_9$, and branch $V_5$ alone corresponds to branch $I_{10}$ during the brief initial test period. All of the resistor-relay branches $V_1$–$V_5$, $I_1$–$I_{10}$, and $S_1$–$S_9$ and relays 254 and 256 are controlled by individual drivers in a relay driver bank indicated by the reference numeral 258.

The voltage differential between the output 272 and the common readout line ROC is applied to a voltage-to-frequency converter 274. The voltage-to-frequency converter is a commercially available item and produces a frequency proportional to the input voltage. The output of the converter 274 is coupled by a transformer 276 to a pulse shaper 278. As a result of the transformer coupling, the amplifier 252 and the converter 274 are free floating and thus measure the voltage between any two leads of the device. The pulse shaper 278 converts the frequency to a pulse train which can be counted by a digital data counter. The digital counter is then enabled for two milliseconds, as will hereafter be described in greater detail. For purposes of the present description, however, it may be considered that the pulse from a two millisecond gate pulse generator 282 gates the pulse train from the pulse shaper 278 through an AND gate 280 to a data counter control 284 which gates the pulse train through to a data counter 286 during a static measurement. The gate pulse generator 282 is initiated by a five millisecond test read signal from a static test control 292.

The output from the pulse shaper 278 is also fed to a frequency discriminator 288 which is set to detect a frequency representative of about 250% of range. The output of the discriminator 288 fires an overload trigger 290 when the frequency exceeds the preselected level. The output of the overload trigger is fed to the static test control 292 which controls the operation of the relay driver 258. Upon receipt of an overload signal from the overload trigger, branches $V_1$–$V_5$ and relay 256 are immediately opened to prevent driving the amplifier 252 into hard saturation.

The static test control receives program instructions from the measurement type and range memory 294 which specify the type of static measurement, whether voltage or current, and the range.

The static measurement system also has an autorange capability as represented by the automatic range control 295. If the count of the data counter is either less than a predetermined minimum, such as 20% of range, or greater than a predetermined maximum, such as 199% of range, then a signal is fed back from the automatic range control 295 to the static test control to change the range to the next lower or next higher range and the measurement repeated. A static test is started on command from the delay test timer 255.

DYNAMIC MEASURING SUBSYSTEM

Synchronization for dynamic measurements is provided by a digital synchronization system 300. Referring to FIG. 7, the synchronization system 300 generates a high frequency reference clock, such as the 100 megacycle clock represented by time line 302, a reset clock represented by the time line 304, a variable clock represented by the time line 306, a delay clock represented by the time line 308, and a sample clock represented by the time line 310. The last four clock pulses all occur in precise synchronization with a pulse of the high frequency reference clock. The period between pulses 304I, 304II, etc., of the reset clock 304 may be selected by programming to occur after any number of reference clock pulses 302, such as from one thousand reference clock pulses to one hundred thousand reference clock pulses. The reset period of the reset clock may conveniently be considered as a logic word having from one thousand to one hundred thousand bits. The variable clock represented by the time line 306 may be programmed to occur a predetermined number of times within each reset period. The delay clock represented by the time line 308 may be programmed to occur at any selected number of reference clock pulses up to one hundred after the occurrence of each variable clock pulse. The sample clock represented by the time line 310 may occur only once during each reset clock period, but may be programmed to occur in synchronism with any reference clock pulse within the period. The reset, variable, delay and sample clocks are programmed from a digital sync memory and interface 311.

The sample clock from the digital synchronization system 300 is applied to a sample clock pulse generator 318 which produces a pulse suitable for triggering the sampling system. The sample clock pulse opens a normally closed electronic switch 320 of a fast ramp generator indicated generally by the reference numeral 322. The fast ramp generator 322 is comprised generally of a current source 324 which is connected to charge one of four capacitors 326–329 through one of four resistors 331–334, depending upon which of four electronic switches 337–340 is closed in response to programmed range information. The capacitors may be selected to provide a fast ramp of different slope. Also, the current into the resistors and capacitors may be varied by turning a transistor 342 "on" which acts as a current source and shunts a portion of the current flow from the source 324 to ground. This is accomplished by reducing the potential at the base of a switching transistor 344 so as to lower the potential of the emitter of the transistor 342.

When the switch 320 is closed, as is normally the case, the output conductor 346 is at some low potential. However, when the switch 320 is opened by the pulse from the sample clock pulse generator 318, the voltage builds as one of the capacitors 326–329 is charged, depending upon which of the switches 337–340 is closed, to produce a linear fast ramp 350 as illustrated in FIG. 7.

The output 346 is connected to one input of a comparator amplifier 354. The other input to the amplifier 354 is connected to the output of a high input impedance amplifier 356. When the voltage of the output conductor 346 exceeds the voltage at the output of amplifier 356, the change in voltage at the output of amplifier 346 is fed back by conductor 352 to again close the switch 320 and quickly discharge the capacitor, thereby returning the voltage at the output 346 to its initial low level.

The amplifier 356 has an adjustable gain and adjustable offset for calibration purposes. The input to the amplifier 356 is derived from a staircase ladder network 358 through a resistor 360. The staircase ladder network provides a large number of selectable voltage levels in equal increments between two limits. For example, in the embodiment of the invention here being described, the staircase ladder provides four thousand equal voltage increments between −2.0 volts and +2.0 volts. The staircase ladder network may be selectively set at any one of the voltage increments by a logic interface designated staircase control 362. The staircase control 362 essentially has two modes of operation, one being the reference mode during which any one of the four thousand voltage levels is generated, and the other being the count mode. In the count mode, the staircase ladder network is successively stepped in cadence to the low speed logic clock, which is derived from the sample clock as is hereafter described, through equal increments as a result of the operation of a staircase counter 364.

The staircase counter 364 is comprised of a units, a tens, a hundreds and a thousands decade, although the thousands decade only counts from zero to three in order to provide four thousand total counts. The counter 364 is connected by the staircase control 362 to step the staircase voltage one voltage unit for each count, a unit being one millivolt. However, for purposes which will hereafter be described in connection with the interlace scan, each low speed logic clock pulse increments the tens decade, rather than the units decade, and the tens decade overflows into the hundreds decade, which overflows into the thousands decade to produce a count of 400 (from 0–399), As a result, the staircase voltage is increased by an increment of ten millivolts for each low speed clock pulse. Then the thousands decade overflows into the units decade and the 400 counts are repeated but each step is 1 millivolt greater than the corresponding step of the previous staircase produced by the preceding 400 steps. The following table, based on a voltage range from −2.0 volts to +2.0 volts and 4,000 increments will serve to illustrate the output of the staircase ladder network when operated in the count mode for the ten interlace scans IS–1 through IS–10.

STAIRCASE VOLTAGES IN COUNT MODE FOR INTERLACE SCANS

| | IS–1 | IS–2 | ... | IS–9 | IS–10 |
|---|---|---|---|---|---|
| Step 1 | −2.000 | −1.999 | | −1.992 | −1.991 |
| Step 2 | −1.990 | −1.989 | | −1.982 | −1.981 |
| Step 3 | −1.980 | −1.979 | | −1.972 | −1.971 |
| Step K | . | . | | . | . |
| Step 397 | +1.970 | +1.971 | | +1.978 | +1.979 |
| Step 398 | +1.980 | +1.981 | | +1.988 | +1.989 |
| Step 399 | +1.990 | +1.991 | | +1.998 | +1.999 |

The staircase voltage at the output of the amplifier 356 is represented by the voltage time line 370 in FIG. 7, with the dotted line 372 representing the level at which no output is produced by the comparator 354. The D.C. offset voltage of the amplifier 356 is adjusted such that when the staircase ladder network is at the lowest voltage and the switch 320 is closed, no output is produced by the comparator 354. However, as soon as the fast ramp 350 exceeds the staircase voltage by an infinitesimal amount, an output is produced by the comparator 354 sufficient to trigger a pulse generator 374. The pulse generator 374 has three outputs, one of which drives a strobe pulse generator 376 which produces a strobe pulse, indicated by the time line 380 in FIG. 7, which is used to momentarily close a sampling bridge switch 378. Thus, the strobe pulses occur when the fast ramp voltage 350 exceeds the staircase voltage 370. When the staircase voltage is at the lowest level represented by the dotted line 372, the strobe pulse 380I occurs substantially in synchronism with the sample clock pulse 310I. But as the staircase voltage increases, strobe pulse 380II is delayed by a time interval equal to the time it takes for the fast ramp voltage to exceed the staircase voltage.

An output from the pulse generator 374 also drives the low speed clock pulse generator 382 which produces a pulse delayed a very short period of time behind the strobe pulse as indicated by the time line 384. The low speed clock 384 provides the cadence for the dynamic measuring system as will hereafter be described, and in particular operates the staircase counter 364 so that the voltage from the staircase ladder network is stepped up in synchronism with the low speed clock 384 as indicated at 370a and 370b. The low speed clock pulse generator 382 also drives a reset clock generator 386 which produces a low speed reset clock represented by the time line 388 and having successive pulses 388I and 388II. The low speed reset clock is used to reset the staircase counter 364 between any two successive low speed clock pulses as represented by the dotted line 387. This permits the use of the staircase counter for certain other control functions which will hereafter be described in greater detail.

As previously mentioned, the sixteen leads $L_1$–$L_{16}$ may be selectively connected to one of the four probe connectors $P_1$–$P_4$ by closing the appropriate relays $L_nR_1$ and $L_nR_3$. The connectors $P_1$–$P_4$ are at the ends of cables $CC_1$–$CC_4$, respectively, which are connected to the inputs of sampling bridges 378a–378d, respectively. The four sampling bridges 378a–378d are each operated by separate strobe pulse generators 376a–376d, all of which are operated by the pulse generator 374.

When a sampling bridge 378 is closed by the pulses from the strobe pulse generator for period on the order of a 0.5 nanosecond, the capacitor 392 assumes a charge between the existing voltage on the capacitor plus some percentage of the difference between the voltage at the particular lead $L_n$ and the existing voltage on the capacitor 392. The voltage on the capacitor 392 is passed through a unity voltage gain high input impedance amplifier 394 and the multiplex unit 396 to input #1 of a high gain, high input impedance comparator amplifier 400. As used herein, a high input impedance amplifier is meant to be an amplifier having a high input impedance as compared to its output impedance. The output from the amplifier 400 is connectable through a normally open electronic switch 402 to charge a capacitor 404, and is connectable through a normally closed electronic switch 406 to charge a capacitor 408. The normally open switch 402 is closed and the normally closed switch 406 opened in synchronized with the closing of the sampling bridge 378 for 1.0 microsecond by a 1.0 microsecond pulse from a single shot pulse generator 410 which is triggered by an output from the pulse generator 374. The voltage on the capacitor 404 is applied to the input of a high impedance, unity gain amplifier 412, and the voltage on the capacitor 408 is applied to the input of an identical amplifier 414. The outputs of the amplifiers 412 and 414 are interconnected by a variable voltage divider 416, the sliding contact of which is connected by conductor 418 to the second input of the comparator amplifier 400. The output of the amplifier 412 is also connected by a conductor 420 back to each of the strobe pulse generators so as to establish the proper reverse bias level for the sampling bridge, and is connected through resistors 422 and four coaxial cables 424 to charge the four input capacitors 392 for purposes which will presently be described in greater detail.

When one of the sampling bridges 378 is closed for a very short duration, for example about 0.5 nanosecond, some percentage of the difference in voltage at the device lead and the voltage stored on the capacitor 392 will be added to the capacitor 392, the percentage being defined as the sampling efficiency of the bridge. For example, if the charge on the capacitor 392 is 1.0 volt and 2.0 volts is present at the device lead, the voltage at the capacitor 392 would be 1.5 volts after the sampling bridge has momentarily closed and then opened, assuming a 50% sampling efficiency. The purpose of the sampling system just described is to produce a voltage at the output of the unity gain impedance amplifier 412 equal to the voltage at the input of the sampling bridge when the bridge is momentarily closed. This is accomplished as follows.

Simultaneously with the closing of the sampling bridge 378, the normally open switch 402 closes and the normally closed switch 406 opens, and this condition persists for approximately 1.0 microsecond. Assume that as the sampling bridge 378 is closed three times in succession, the voltage at the input of the bridge is a positive 1.0, 2.0 and 3.0 volts, respectively. Also assume for ease of illustration that the sampling efficiency of the bridge is 50% and that the initial voltage charge stored on each of the capacitors 392, 404 and 408 is 0.0 volt. After the sampling bridge 378 has closed momentarily, the capacitor 392 will be charged to 0.5 volt. The unity gain amplifier 394 applies the 0.5 volt to the first input of the high gain operational amplifier 400. Since the switch 402 is closed and the switch 406 is open, the capacitor 404 is quickly charged by the high output of the amplifier 400 because the initial feedback through conductor 418 to the second input of the amplifier 400 is 0.0 volt. The capacitor 404 is charged until the voltage at the output of the unity gain amplifier 412 is sufficient to raise the voltage at the second input of the amplifier 400 to 0.5 volt. Since the sliding contact on the variable resistor 416 is set at 50%, and since the charge on the capacitor 408 is 0.0 volt, the output voltage at the amplifier 412, and hence the charge on the capacitor 404, must reach 1.0 volt before the amplifier 400 is balanced and charging of the capacitor 404 ceases. This condition occurs during the period when the switch 402 is closed and the switch 406 is open. The time constant of resistor 422 and capacitor 392 is sufficiently long that the change in the voltage on capacitor 392 is of no consequence during the period while switch 402 is closed, and any such change appears as an increase in sampling efficiency of the sampling bridge and can be compensated by adjusting resistor 416.

After switch 402 opens and switch 406 closes, the capacitor 392 is charged up to 1.0 volt over a period of about 9.0 microseconds and the capacitor 408 follows the charging of capacitor 392 as a result of the imbalance at the inputs of amplifier 400 until the charge on all three capacitors 392, 404 and 408 is 1.0 volt, which was the presumed voltage at the device lead.

When the sampling bridge 378 next closes, the input voltage is assumed to be 2.0 volts. The voltage on the capacitor 392 is 1.0 volt due to the previous sample. When the sampling bridge again opens, the charge on the capacitor 392 will have been increased to 1.5 volts, or 50% of the level between the input voltage to the bridge and the voltage on the capacitor 392 before the sample, due to the 50% sampling efficiency presumed for the bridge. The 1.5 volts is passed through the unity gain amplifier 394 and the multiplexer 396 to the first input of the amplifier 400. Since 1.0 volt is fed back to the second input of the amplifier 400 by conductor 418, the capacitor 404 is first charged by the output until the feedback through the amplifier 412 and the voltage divider 416 rebalances the amplifier 400, because switch 402 is closed and switch 406 is open. In order for the voltage at the second input of the amplifier 400 to be 1.5 volts, the voltage at the output of the amplifier 412 must be 2.0 volts because the voltage at the output of the amplifier 414 is 1.0 volt and the voltage divider 416 is set at 50%. Thus, the 2.0 volts at the output of the amplifier 412 is the same as the 2.0 volts at the input to the sampling bridge. After switch 402 opens and switch 406 closes, the 2.0 volts at the output of amplifier 412 is again transferred through the coaxial cable 424 and resistor 422 to charge the capacitor 392 and thus capacitor 408 to 2.0 volts so as to again balance the amplifier 400.

It should be noted that any D.C. offset voltage errors in the sampling system are ultimately stored on capacitor 408 and therefore no significant errors appear in the output of amplifier 412. Further, the high gain of the amplifier 400, which may be on the order of 20,000, makes any offset voltage errors in the switches 402 and 406 or in the amplifiers 412 and 414 negligible when compared to the measuring capabilities of the system. Thus, the output voltage from the amplifier 412 is always equal to the voltage at the input of the sampling bridge at the time the sampling bridge switch is closed.

When operating in the scan mode, the sampling system reproduces the waveform at the device lead by a stair step approximation, but at a much lower frequency. Assume that two successive reset clock pulses are represented at 304I and 304II. Then the first, second and third variable clock pulses 306a, 306b and 306c occur on predetermined 100 megacycle clock pulses after the occurrence of each reset clock pulse 304I and 304II. Assume also that the variable clock pulses 306a, 306b and 306c are used to initiate the rise of test pulses 314a, 314b and 314c and that the corresponding delay clock pulses 308a, 308b and 308c are used to initiate the fall of the test pulses. Each of the test pulses 314a, 314b and 314c is thus oriented in precise relationship to the preceding reset clock pulses 304I or 304II. Assume also that this train of test pulses appears as illustrated in FIG. 10 at an input lead of the device under test. A complementary waveform comprised of a pulse train represented by the time line 315, such as might be produced at an output lead of the device as a result of the input stimulus, is also illustrated, but this waveform will not now be discussed. Assume also that the sample clock pulses 310I and 310II are programmed to occur between the first and second test pulses 314a and 314b after each reset clock pulse, and that the fast ramp generator is set such that the fast ramp voltages 350I and 350II, which start at $T_0$ in synchronism with the sample clock pulses 310I and 310II, end after the fall of the third test pulse 314c. Since each sample clock pulse 310 occurs precisely the same number of 100 mc. clock pulses after each reset clock pulse 304, and since each successive variable clock pulse is also referenced to the preceding reset pulse, the point $T_0$ will occur at the same relative position with respect to the second and third test pulses 314b and 314c during each of the periods I, II, etc. defined by the reset clock pulses 304I and 304II. It will be appreciated that there may be several thousand variable clock pulses 306 between each two reset clock pulses 304, but only one sample clock pulse.

When operating in the scan mode, the staircase ladder network is operated in the count mode to produce a series of ten staircase voltage ramps heretofore described. At time $T_0$, the output from the amplifier 356 will be at the reference potential and the strobe pulse will occur essentially at time $T_0$, the sampling bridge 378 will momentarily close, and the voltage at the output of a sampling system will be equal to the voltage of the sampled waveform 314 at time $T_0$. Just after the sample, the low speed logic clock 384 actuates the staircase counter which increases the staircase voltage by ten millivolts as heretofore described. As a result, the second fast ramp pulse 350II does not exceed the staircase voltage until a point in time $1/400$ of the time period of the fast ramp after $T_0$, or at time $T_{10}$, on the test pulses 314b and 314c following the second reset pulse 304II. Similarly, succeeding strobe pulses are each delayed by $1/400$ of the ramp period so that samples are taken at $T_{20}$, $T_{30}$, etc. up to $T_{3990}$ on the pulses 314b and 314c occurring during successive reset clock periods. As a result, the waveform within the period $T_1$–$T_{4000}$ is reproduced at the output of amplifier 412, but at a much slower frequency equal to $1/400$ of the frequency of the reset clock, which in turn is merely a fraction of the frequency of the variable clock and hence of the test pulse train 314. This scan constitutes interlace scan IS–1. During interlace scan IS–2, the procedure is repeated except that because each ten millivolt stair step level of the staircase voltage is 1.0 millivolt higher than corresponding stair steps during IS–1, the samples are taken at times $T_1$, $T_{11}$, $T_{21}$, etc. During the third interlace scan, the samples are taken at times $T_2$, $T_{12}$, $T_{22}$, etc. until ten interlace scans are completed for purposes which will hereafter be described in greater detail.

The sampling system may also be operated in such a manner as to repeatedly sample the test waveform 314 at any point between $T_0$ and $T_{4000}$ during each fast ramp voltage. Of course, since $T_0$ is variable to any 100 mc. clock pulse by programming the sample clock, the test waveform 314 may be sampled at any point. This is accomplished merely by programming the staircase ladder network 358 to continuously produce a static voltage at a level corresponding to the particular time $T_n$ of interest during the field-of-view defined by the fast ramp, i.e., $T_0$–$T_{4000}$. As a result, the successive strobe pulses 380 are generated at the same time during each reset period and all samples are taken at the same time $T_n$ on each of the sampled repetitive pulses of the test waveform.

Provision is also made to selectively transfer the voltage at the output of the staircase ladder network 358 to the output of the sampling system for reference purposes, which is referred to as the reference mode. This is true whether the staircase ladder network is operating in the count mode or steady state program mode. The output from the staircase ladder network 358 is connected through resistors 425 and 426 to the input of a high impedance, unity gain amplifier 428 which is connected through a pair of resistors 429 and 430 to the output of impedance amplifier 412. The resistors 429 and 430 form a voltage divider and the junction 431 is the output of the sampling system. A pair of electronic switches 432 and 433 are provided to isolate the staircase voltage from the amplifier 428 and hence from the output 432 by grounding the input of the amplifier 428 when closed. The switches 432 and 433 are operated complementary to the switch 373 and to the ground probe switches $L_nR_1$, $L_nR_2$ and $L_nR_3$.

When the system is operating in the sample mode, either for scanning or for sampling at a selected point in time, switches 432 and 433 are closed with switch 373 is open. However, when the system is operating in the reference mode, the switches 432 and 433 are open and the switch 373 is closed to ground the input to amplifier 356, and in addition all of the switches $L_nR_1$ at the test station are open and the switches $L_nR_2$ and $L_nR_3$ are closed to ground all dynamic sensing probes to insure that the inputs to the sampling bridges 378 will be at ground and that capacitors 404 and 408 will store a ground reference voltage. The staircase ladder network 358 may then be used to supply any of the four thousand reference voltages between $-2.000$ volts and $+2.000$ volts to the output 431 for normalization, i.e., reference purposes, or may supply the ten successive staircase voltages produced when operating in the count mode in order to measure amplitudes as will hereafter be described.

The output 431 of the sampling system is connected to input #1 of a comparator amplifier 434 of a reference and comparison system. The output of the amplifier 434 is connectable through a pair of switches 435 and 436 and diodes 438 and 440 to charge a capacitor memory M–II. The output of the amplifier 434 is also connectable by switches 444 and 446 through diodes 448 and 450 to charge a capacitor memory M–I. The voltage on the memory M–II is applied to the input of the high impedance, unity gain amplifier 454 and the output of the amplifier 454 is applied to the 100% terminal of a percent digital-to-analog converter 456 which is a programmable voltage divider ladder network as will hereafter be described in detail. The voltage on the memory M–I is applied to the input of a high impedance, unity gain amplifier 458 and the output of the amplifier is applied to the 0% terminal of the DAC 456. The output 460 of the DAC 456 is connected to input #2 of the comparator amplifier 434. Thus if the percent DAC 456 is programmed at 0%, the voltage on memory M–I is applied to input #2 of the comparator amplifier 434. If 100% is programmed, the voltage stored on the memory M–II is applied to the input #2 of the comparator amplifier 434. Any percent between 0% and 100% can also be programmed in which case a voltage equal to the voltage stored on memory M–I plus the programmed percent of the difference between the voltage stored on memory M–II and the voltage stored on memory M–I will be applied to the second input of the comparator amplifier 434.

Whenever the voltage applied to input #1 of the comparator amplifier 434 exceeds the voltage fed back from the percent DAC 456 at the second input and switches 435, 436, 444 and 446 are open, the gain of the amplifier 434 coupled with the gain of a high impedance, high gain amplifier 462 is sufficient to change the output of the amplifier 462 from a "0" logic level of 0.0 volt to a "1" logic level of $+4.0$ volts.

Assume now that it is desired to store the voltage level applied to input #1 of the comparator amplifier 434 on capacitor memory M–I. The percent digital-to-analog converter 456 is set to 0.0% so that the output of the unity gain amplifier 458 is connected to input #2. Switches 444 and 446 are closed. When the voltage is applied to input #1, amplifier 434 produces an output which is applied through the switches 444 and 446 and the diodes 448 and 450 to rapidly charge the capacitor memory M–I. The voltage level on memory M–I is fed back through the amplifier 458 and the percent DAC 456, without division, to input #2 of amplifier 434 until the feedback voltage at input #2 equals the input voltage at input #1. Then the output from the comparator amplifier terminates and the voltage stored on the memory M–I is equal to the voltage at input #1. The procedure for storing a voltage on memory M–II is the same except that switches 435 and 436 are closed rather than switches 444 and 446 and the percent DAC 456 is programmed at 100%. The most positive voltage applied to input #1 during a given time period can be stored on capacitor memory M–I by closing only switch 444, or on memory M–II by closing only switch 435 as a result of diodes 448 and 438, respectively. Similarly, the most negative voltage value can be stored on M–I by closing only switch 446 so that the diode 450 is operative, or on M–II by closing only switch 436 so that diode 440 will be operative.

All dynamic measurements are based upon the reference voltage fed back from the percent DAC 456 to input #2 of the comparator 434. This feedback reference voltage is derived from the voltages stored on either or both of the capacitor memories M–I and M–II. For this reason, the automatic operation of the system provides a normalization I period during which a voltage is stored on memory M–I followed by a normalization II period during which a voltage is stored on memory M–II. After normalization of either or both memories M–I and M–II, the voltage on either memory M–I or M–II, or a voltage equal to the voltage on M–I plus a programmed percent of the voltage on M–II minus the voltage on M–I may be fed back to input #2 of the comparator amplifier 434 and compared to the voltage at input #1. For example, the voltage on memory M–I can be applied to input #2 by programming the percent DAC to 0.0%. Similarly, the voltage on memory M–II may be applied to input #2 by programming the percent DAC 456 to 100%. When the percent DAC 456 is programmed to any percent other than 0.0% or 100%, it acts as a voltage divider so that the feedback reference voltage is equal to the voltage on memory M–I plus the programmed percent of the difference between the two voltages. For example, assume +1.0 volt on M–I and +2.0 volts on M–II with 40% programmed. The feedback reference voltage would then be +1.4 volts. Whenever the voltage at input #1 of comparator 434 is equal to or less than the voltage at input #2, the output of amplifier 462 is 0.0 volt or a logical "0," and whenever the potential at input #1 exceeds that at input #2, the output of amplifier 462 is +4.0 volts or a logical "1," assuming that switches 435, 436, 444 and 446 are open.

The output from amplifier 462 is applied to a transition detector 464. The transition detector 464 includes a counter which requires that a logic "1" level be present at the output of amplifier 462 for three successive counts of the low speed logic clock. If the output of amplifier 462 should return to "0" level before the count of three, the counter is reset and the count resumed when the output returns to a logic "1" level. The transition detector 464 also has a second counter and logic circuitry which can be programmed to indicate either the first or second transition. Positive transitions are indicated by the transition from logic "0" to logic "1." The first and second negative transitions are detected by inverting the logic signal from the amplifier 462 and using the same counters. Then when input #1 of comparator 434 changes from more positive to more negative than input #2, a transition will be detected. The transition signal is fed through conductor 468 to a dynamic sequence timetable 470 which transmits a stop count signal to the data counter control 284 as represented by the line 472 instructing the data counter control to terminate the data count by the counter 286.

Figure 11:
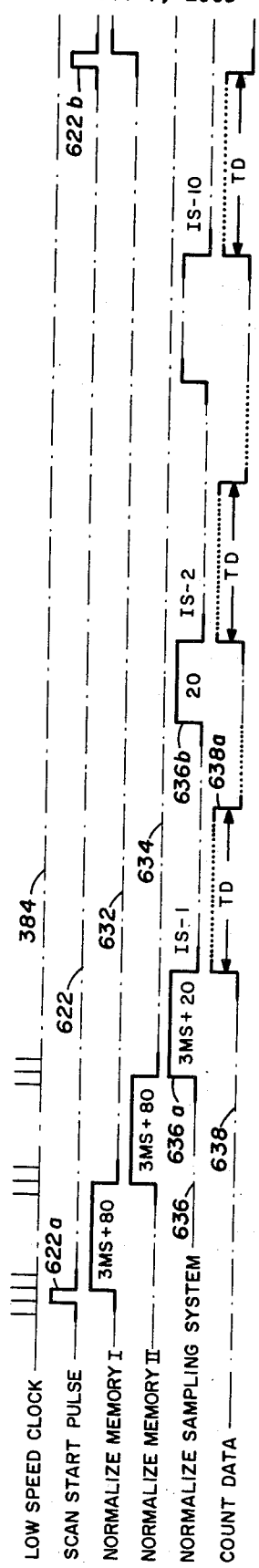
FIG. 11 is a timing diagram which illustrates the automatic sequence during major scan I with other than peak storage.
Figure 12:
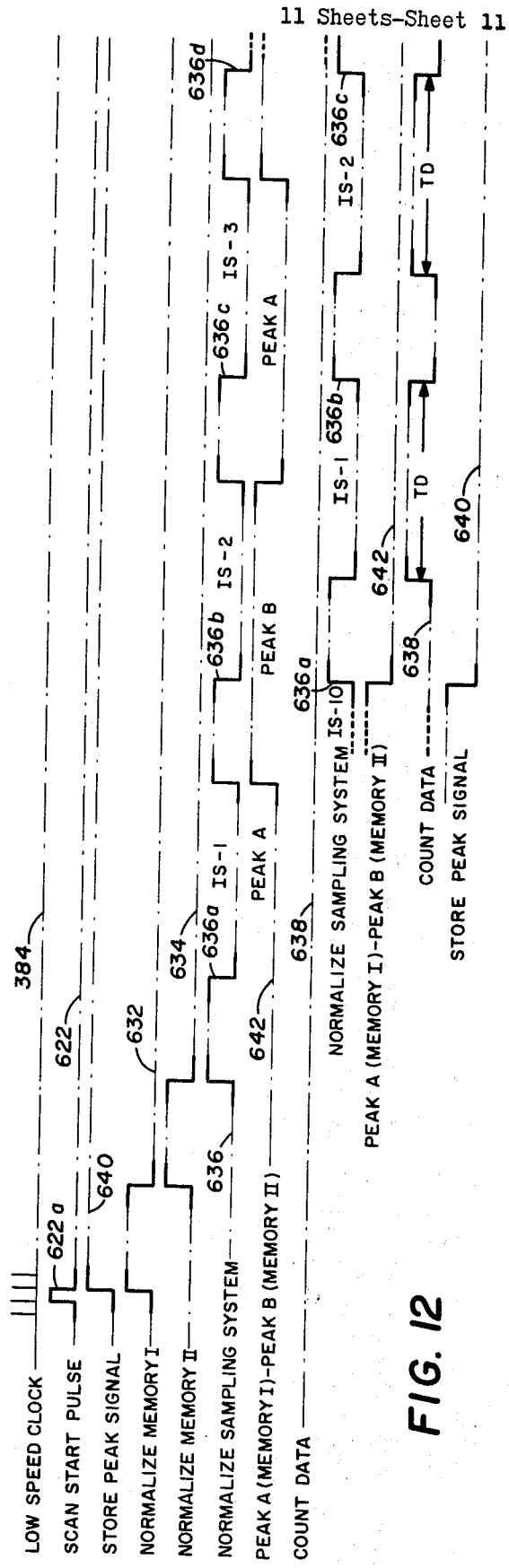
FIG. 12 is a timing diagram which illustrates the automatic sequence during major scan with peak storage.

The dynamic measurement sequence is automatically controlled by the dynamic sequence timetable 470 and the dynamic sequence interface 474. The low speed logic clock represented by the time line 384 in the timing diagrams of FIGS. 9, 11 and 12 provides, as previously mentioned, the cadence for the dynamic measuring subsystem. On the first low speed clock pulse after the start measurement signal 614 from the delay test timer 255, a dynamic start measurement signal 620 is produced. This signal initiates the rise of a start scan pulse 622a on time line 622 which lasts for one low speed clock pulse. One clock pulse after the dynamic test start signal comes up, major scan I signal 624 comes up and stays up until both major scans have been completed. At the completion of major scan I, a second scan start pulse 622b is generated and lasts for one clock pulse and causes major scan II signal 626 to come upto a logic "1" level. Major scan I signal (MS–I) and major scan II signal (MS–II) are used to gate the appropriate program information out of the various memories at the proper time as will hereafter be described. Major scan I period is indicated by major scan I signal 624 being up and major scan II signal being down, and the major scan II period is indicated by both major scan I and major scan II signals being up. After the ten interlace scans of major scan II, start measurement signal 620 falls to "0" logic level, thereby instigating the test complete signal 616 and the record test results signal 618 in FIG. 8. One clock pulse later, major scan I signal 624 and major scan II signal 626 return to "0" logic level.

FIG. 11 illustrates by time lines the sequence of events within a major scan, for example major scan I, when a peak amplitude is not to be stored. At the fall of scan start pulse 622a and the start of major scan I, a normalize memory I signal 632 comes up for three milliseconds plus eighty low speed clock pulses. During this period, which may be hereafter referred to as normalization period I, a voltage is stored on capacitor memory M–I which is derived from a source determined by programmed information as will presently be described. At the end of normalization period I, a normalize memory II signal comes up for three milliseconds plus eighty low speed clock pulses. During this period a reference voltage is stored on memory M–II. This period is hereafter referred to as normalization period II. Then a normalize sample system signal 636 comes up for three milliseconds plus twenty low speed clock pulses as indicated by pulse 636a to permit the sampling system to normalize on the voltage at $T_0$.

At the end of the first normalization period 636a for the sampling system, the tens and hundreds decades of the staircase counter, which are used to count the twenty clock pulses, are reset to zero so that interlace scan IS–1 may start on the next low speed clock pulse. At the same time, the count data signal 638 comes up and activates the data counter 286 through the data counter control 284 so that it may also begin on the next count. The data count signal 638 stays up until a transition detection signal is received at the dynamic sequence timetable from the transition detector 464 through conductor 468 at which time the count data signal 468 returns to logic "0" level and the data counter ceases counting. During major scan I the data counter 286 counts in subtract mode, unless otherwise programmed. The normalize sampling system signal 636 may come up at the transition detection 638a to start the second normalization period 636b, or may optionally, by manual control, remain down until the staircase counter reaches a count of three hundred ninety-nine in order to complete the entire interlace scan IS–1 for display purposes before starting the normalization period 636b. After the second normalization period 636b, interlace scan IS–2 starts. Normalization periods 636b, 636c, etc. are provided between the ten interlace scans to permit the sampling system to normalize at $T_0$. During the set of interlace scan periods, either a time or voltage measurement can be made. In either case, the data counter counts in subtract mode and merely continues the count during each interlace scan and the final data count at the end of interlace scan IS–10 represents the first measurement value. After the tenth interlace scan IS–10, scan start pulse 622b occurs and starts major scan II during which the same procedure is repeated, except that the data counter begins, without being reset, to count in the add mode so that the final reading of the data counter provides the differential measurement between the two measurements made during the two major scans.

When the peak amplitude occurring during a particular time interval is to be stored on either memory M–I or memory M–II, the sequence illustrated by the time lines in FIG. 12 is followed rather than the sequence illustrated in FIG. 11. The peak storage sequence is the same as the normal storage sequence except that a store peak signal represented by the time line 640 comes up at the end of scan start pulse 622a. Normalize memory I signal 632, normalize memory II signal 634 and normalize sampling system 636 occur as previously described except that the first ten interlace scans all proceed to the full three hundred ninety-nine count. However, the data count signal 638 remains at "0" logic level during the first ten interlace scans. A peak store signal 642 complements at the end of each of the first ten interlace scans. The peak store signal 642 is used to effect the storage of one peak, designated peak A, on memory M–I during the odd numbered interlace scans IS–1, 3, 5, 7 and 9, and the storage of a second peak, designated peak B and usually of the opposite polarity, during the even numbered interlace scans IS–2, 4, 6, 8 and 10. After interlace scan IS–10, the ten interlace scans are repeated during which the count data signal 638 is brought up to initiate the data count during each interlace scan as illustrated so as to make the desired amplitude or time measurements based on the voltage or voltages stored in memories M–I and/or M–II.

Although the automatic sequence provides for normalization periods I and II during which a voltage may be stored on memories M–I and M–II, respectively, and also provides, if desired, peak storage periods for storing a peak amplitude on either memory M–I or memory M–II during each of major scans I and II, it will be appreciated that never are more than two of these storage periods utilized, except when a memory is normalized at the opposite high voltage during peak storage, and frequently only one storage period is utilized. For example, assume that it is desired to measure the amplitude of the pulse 314a at $V_{S2}$ with respect to the voltage at $V_{S1}$. For this measurement, the staircase control 362 would be programmed, during normalization period I of major scan I, to produce a steady state voltage at the output of the staircase ladder network 358 at a level such as to produce a strobe pulse at time $V_{S1}$ within the fast ramp period $T_0$–$T_{4000}$. The sampling system automatically operates in the sampling mode unless a signal is received on cable 528 from the dynamic sequence interface to ground the probe and input to amplifier 356 by closing switches $L_nR_2$, $L_nR_3$ and 373 and connect the staircase ladder network 358 to the output 431 by opening switches 432 and 433. Nothing would be programmed for normalization period II of major scan I. For all voltage measurements, the sampling system is programmed to operate in reference mode during the interlace scan periods of both major scans I and II. By reference mode it is meant that the output voltage of the staircase ladder network 358 is applied to input #1 of the comparator amplifier 434. It will be noted that only capacitor memory M–I is being used to store a reference voltage during major scan I.

For major scan II, normalization period I, the staircase control 362 is programmed to operate in the steady state program mode and produce a constant staircase ladder network voltage selected to produce a strobe pulse at time $V_{S1}$, and the sampling system is programmed to operate in the sample mode. Nothing is programmed for normalization period II for major scan II. The sampling system is again programmed to operate in the reference mode, i.e., connect the ladder network 358 to input #1 of the comparator 434.

Then when the system is placed in automatic operation, the system will first take repeated samples of the waveform at $V_{S1}$ during normalization period I of major scan I, and the voltage at $V_{S1}$ will be stored on memory M–I. It is immaterial for an amplitude measurement what voltage is stored on memory M–II because the DAC will subsequently be programmed at 0%. During each of the ten interlace scans of major scan I, the staircase control 362 will automatically operate the staircase ladder network in the count mode, and the data counter 286 will automatically be initiated to count, in the subtract mode, the total number of low speed clock pulses occurring during the ten periods defined by the start of each interlace scan and the subsequent transition detection. The total number will be representative of the voltage at $V_{S1}$ with respect to some unknown voltage level.

During normalization period I of major scan II, the sampling system takes repeated samples of the waveform at time $V_{S2}$ and this voltage is again stored on memory M–I. Again the voltage stored on memory M–II is immaterial. The sampling system again operates in reference mode during the interlace scans of major scan II, as will always be the case for amplitude measurements. The data counter 286 again is activated to count the total number of pulses occurring within the count periods of the ten interlace scans of major scan II, but this time the data counter counts in the add mode. The final reading on the data counter is then a direct measure of the difference in the voltage between point $V_{S2}$ and point $V_{S1}$.

It will be appreciated that the amplitude between any two points on the waveform 314 within the time period $T_0$ to $T_{4000}$ can be measured in the same manner by selecting the proper voltage from the staircase ladder network to produce the strobe pulse at the desired time $T_n$ during the normalization period of each major scan. It will also be appreciated that any voltage which can be stored on either memory M–I or M–II can be measured with respect to any other voltage which can be stored on one of the memories. Therefore any point on the waveform can be measured with respect to any reference voltage. In particular, any of the four thousand voltage levels from the staircase ladder network may be stored on either of the memories M–I or M–II by operating the ladder network at the programmed level and operating the sampling system in the reference mode during the appropriate normalization period. Of course, the voltage at any lead of the device identifiable by time may be measured with respect to the voltage at any other device lead which is identified by time. Further, either positive or negative peak voltages, $+V_P$ or $-V_P$ on the waveform 314 for example, may be stored and measured during a major scan period. For example, $+V_P$ could be stored, when operating in the peak store mode of FIG. 12, on memory M–I during interlace scan periods 1, 3, 5, 7 and 9 by closing only switch 444 and operating the staircase ladder network in the count mode and the sampling system in sample mode. Then the peak voltage $+V_P$ would be measured during the second ten interlace scans by standard voltage measurement procedures. This measurement could be programmed during either major scan I or major scan II so as to provide a measurement relative to any other voltage stored and measured during the other major scan. The negative peak $-V_P$ could be measured in precisely the same manner except that it would be stored on memory M–I by closing switch 446 during the first ten interlace scans.

Time measurements can be made between amplitude percent levels or voltage levels. In order to obtain percent levels, it is first necessary to define to 0% and 100% levels, which may hereafter be referred to as normalization points, by a time $T_n$ between $T_0$ and $T_{4000}$, or by a known or selected reference level, and then to store these reference values on memories M–I and M–II, respectively, during MS–I and MS–II, respectively. Then the percent DAC is programmed to derive the desired percent level to be detected during each major scan. For example, assume that it is desired to measure the rise time of the pulse 314b between a lower percent level $V_X$, such as 15%, and a higher percent level $V_Y$, such as 85%, based upon a % value at $V_{S1}$ and a 100% value at $V_{S2}$. The voltage $V_{S1}$ would be stored on memory M–I during normalization period I of major scan I, and $V_{S2}$ would be stored on memory M–II during normalization period II of major scan I. The percent DAC 456 would be programmed for 15% during the ten interlace scans of major scan I and the sampling system would be operated in the scan mode during major scan I. The data counter 286 would then count, in subtract mode, the low speed logic clock pulses, and hence the number of samples, from $T_0$ until a transition at $V_X$ for each of the ten interlace scans and thereby sum the total number of samples during the ten scans. During major scan II the voltages $V_{S1}$ and $V_{S2}$ would again be stored on memories M–I and M–II during normalization period I and normalization period II. However, the DAC 456 would be programmed for 85% during the ten interlace scans of major scan II. As a result, the data counter 286, counting in add mode, would then count the total samples taken during the ten interlace scans from $T_0$ until a transition at $V_Y$ of each scan. The reading on the data counter would then represent the time required for the pulse 314b to rise from the 15% level to the 85% level. Of course, it will be appreciated that any percent level between two reference voltages stored on memories M–I and M–II can be detected merely by programming the DAC 456, and the time period between any two such detectable percent levels can be measured as described above.

It will be appreciated that other voltage levels on the waveform can be defined as the 0% and 100% normalization points. For example, the negative peak $-V_P$ might be selected as the 0% level and the positive peak $+V_P$ selected as the 100% level. Or the voltage at $V_{S1}$ might be selected as the 0% level and the positive peak $+V_{P1}$ as the 100% level, etc.

Since the transition detector 464 can be programmed to detect either the first or second positive transition, or the first or second negative transition, time measurements can be made between any percent level on any transition and any other percent level on any other transition within the count capabilities of the transition detector. Further, since the sampling system may be connected to sample the waveform at any one lead during major scan I and any other waveform during major scan II, time measurements may be made between any identifiable transition point on a waveform occurring at one lead and any identifiable transition point on another waveform occurring at any other lead. For example, if the waveform 314 is an input waveform at one lead, and the waveform 315 is the waveform at a complementary output lead, the delay time between a percent transition point on waveform 314 and the corresponding percent transition point, or any other detectable point, on the waveform 315 can be measured. It is to be understood that the above enumerated measurements are merely exemplary. It will occur to those skilled in the art that many other measurements can be made using the basic capabilities of the system.

The test station memory 524 stores program information for major scan I and major scan II and program information for controlling the D.C. bias supply and static measurement relays $L_nK_n$. This information is gated through a test station interface 526 to the test station relay drivers 150 by the major scan I signal (MS–I) and the major scan II signal (MS–II) from the dynamic sequence timetable. The ground probe signal represented by the control line 528 from the dynamic sequence interface 474 is also fed to the test station interface to open relays $L_nR_1$ and close relays $L_nR_2$ and $L_nR_3$ when the sampling system is being operated in the reference mode.

Memories $M_1$–$M_{10}$ store program information concerning whether the respective D.C. bias supplies #1–#10 are to operate as voltage or current supplies, the magnitude and polarity, and the time at which the respective supplies are to be activated. Pulse generator memories 243 and 244 are programmed with information concerning the time of activation, rise time, fall time, amplitude, pulse width, etc. The test start memory 296 is programmed with information concerning the time at which the test start signal 608 occurs and the delay period for the delay test timer 255. The measurement, type and range memory 294 is programmed with information concerning whether a static or dynamic measurement is to be made, and whether a voltage, current, amplitude or time measurement is to be made, and the range. This program information is fed to the static test control 292 by cable 293, and to the fast ramp generator, the dynamic sequence timetable and the range and type decoder 516 by cable 519. The digital sync memory and interface 311 is programmed with information concerning the period of the reset clock, the period of the variable clock, the delay period of the delay clock, and the time position of the sample clock.

Normalization I memory 476 stores program information for controlling the operation of the sampling system during the normalization I periods of both major scan I and major scan II. Normalization II memory 478 stores program information concerning the operation of the sampling system during normalization II periods of both major scan I and major scan II. A percent DAC and transition detector memory 480 has major scan I and major scan II sections. Gate logic circuit 482 gates out either the major scan I information or the major scan II information from the normalization I memory 476 in response to major scan I signal MS–I and major scan II signal MS–II from the dynamic sequence timetable. It will be recalled from FIG. 9 that when the major scan signal MS–I is up and major scan signal MS–II is down, major scan I period is indicated. Thus during major scan I, the information for normalization period I of major scan I is gated out through cable 483 to the staircase control 362 and through cable 484 to the dynamic sequence timetable 470 and to the dynamic sequence interface 474. Similarly, gate logic circuit 485 alternatively gates out either the normalization II program information for major scan I or major scan II in response to the major scan signal MS–I and major scan signal MS–II received from the dynamic sequence timetable. This information is applied through cable 486 to the staircase control 362 and through cable 487 to the dynamic sequence timetable 470 and to the dynamic sequence interface 474. Since the normalization I and normalization II program information for major scan I is simultaneously gated to the staircase control, the staircase control selectively gates either normalization I program information or normalization II program information to the staircase ladder network in response to the signals 632 and 634 (see FIG. 11) on lines N–I and N–II, respectively. The same procedure occurs during major scan II. A line designated by the reference character C feeds a signal to the staircase control 362 from the dynamic sequence interface 474 to cause the staircase ladder network to be connected to the staircase counter and operate in the count mode. Lines $C_{20}$ and $C_{80}$ sense when the staircase count reaches the counts of twenty and eighty and this information is used by the dynamic sequence timetable to terminate the normalization periods I and II and the normalization period for the sampling system as previously described and reset the staircase counter by the reset line 475. The dynamic sequence timetable 470 and the dynamic sequence interface 474 also contain gate logic necessary to sequentially employ the normalization I and normalization II program information that is fed simultaneously through the cables 484 and 487 during each of the major scans. In particular, the dynamic sequence interface 474 gates the normalization I and normalization II information to the switches 435, 436, 444 and 446 through the cable 488.

The slope of the fast ramp from the fast ramp generator 322 may be selectively varied during the normalization periods I and II and the scan periods of both major scan I and major scan II. This permits the range to be expanded (i.e., the slope of the ramp decreased to increase the field of view) so that either or both of the voltage memories M–I and M–II may be normalized at a more stable point on the waveform remote from the points to be measured. For example, if a rise time between two percent levels is being measured, the 100% normalization point can be picked at a delayed point on the waveform which is more stable by increasing the field of view, and then, by again decreasing the field of view for the actual measurement, the resolution may be maximized by the narrowed field of view. The range information for the four normalization periods is stored in the normalization I and normalization II memories 476 and 478 and gated out by gate logic circuits 482 and 485 through cable 477 to the measurement type and range memory 294 during the appropriate period. The appropriate period is determined by the logic levels on the control lines MS–I, MS–II, N–I and N–II going to each of the gate logic circuits 482 and 485, as heretofore described. The information is then passed through cable 519 to the ramp generator 322.

Gate logic circuit 490 similarly gates through major scan I or major scan II information in response to the application of the major scan signals MS–I and MS–II. This information is fed through cable 493 to a percent DAC interface 494 which controls the operation of the percent DAC 456. The normalization I and normalization II signals N–I and N–II, respectively, are also applied to the percent DAC interface 494. The normalization I signal automatically switches the percent DAC to 0.0% and the normalization II signal automatically switches the percent DAC to 100%. The absence of either signal switches the percent DAC to the programmed percent. Gate logic 490 also gates out the transition detection program information for either major scan I or major scan II and this is applied to the transition detector 464 by control cable 496. Since the transition detector 464 is operative only during the interlace scan period, program information is required only for major scan I and major scan II. However, the program information to the transition detector permits the selective detection of the first or second positive or the first or second negative transitions during either major scan period to permit comparative time measurements between any two of these four transitions.

A data counter memory 500 stores program information regarding the operation of the data counter 286 and this information is fed to the data counter control 284 which in turn controls the data counter 286. The output from the data counter 286 is applied to a pair of digital comparators 502 and 504 which are programmed from minimum limit memory 506 and maximum limit memory 507, respectively, to determine whether the data count is less than, greater than or equal to the programmed minimum, or less than, greater than or equal to the programmed maximum. The output from each of the digital comparators 502 and 504 is applied to a display unit 508 and to a classification unit 509 as represented by the data lines 510 and 512, respectively. The data count from the counter 286 is also applied to a binary-to-decimal decoder 514 which decodes the data count to decimals, and the decimal information is fed to the display unit 508.

In carrying out a series of tests on a particular electronic device, the special socket 22 and socket board 24 are connected to the relay test station 25 by the connectors 30. The code programmed on the printed circuit board 24 is fed through the contacts 34 to the control unit 250 for identification purposes to insure that the proper socket is used. The printed circuit performance board 28 is wired so that the proper leads of the test device will be connectable to the necessary D.C. bias supplies #1–#10 and to the proper pulse generator I or II by closing one of the relays $L_nR_n$. Various loads, represented by the resistor 144 in FIG. 3, may also be connected between the appropriate terminals on the performance board 28 as required.

The drawer 98 is pulled out and the performance board 28 laid in place on the tray 90 and the connectors 120 engaged so that the pulse generators I and II will be connected to the buses $DP_1$ and $DP_2$. The connectors 142 are forced over the edges of the board, the drawer pushed in, and the camming means 96 activated to lift the performance board until the button contacts 86 engage the respective spring contacts 68.

The programming media, such as punched paper, is programmed with information indicating the start of test No. 1 and each memory is successively programmed. The information for each memory is preceded by the address for the memory. For the first test, all memories must be full because the memories are of the shift register type. A stop signal is placed on the program tape after all of the program information for the first test. Then each successive test is programmed in order on the tape followed by a stop signal. Since the memories are shift registers and are randomly addressable through the control unit 250, only those registers wherein the test criteria are to be changed need to be reprogrammed for subsequent tests. The program tape is then inserted in the programming unit 252.

The measuring system may be operated in either the automatic or manual mode. In the manual mode, each test is first programmed on a manual signal, then the test performed in response to a manual signal. After the test is performed, operation of the system ceases until the second test program is manually instigated. If desired, however, all tests on the program may be automatically performed once the system is set in operation to program test No. 1. After the final test is completed and the tape reaches the starting point for the first test, operation of the system is automatically terminated. Another device may then be inserted in the socket and the series of tests repeated.

Although portions of the control circuits, such as the dynamic sequence timetable and the dynamic sequence interface, have not been described in detail, the logic function of these various control circuits have been described in sufficient detail to permit one skilled in the art to design a suitable logic circuit. The staircase counter 364 may be substantially identical to the data counter 286, differing in that the reverse count logic is not required and in the manner in which the decades overflow as heretofore described. The staircase ladder network 358 may be of the same configuration as the percent DAC 456, except that a greater number of decades are provided. The staircase control 362 may merely comprise three sets of AND gates, each including a gate for each input of the staircase ladder, which correspond in number to the outputs of the counter 364. Any one of the three sets of gates may be selectively enabled by the lines N–I, N–II or C to effect the operation of the staircase ladder 358 as heretofore described.

From the above description it will be apparent to those familiar with the art that a novel and highly useful measurement system has been described. The system may be used to perform substantially any measurement on substantially any electronic component or circuit. The system is capable of performing a wide variety of static measurements and a wide variety of dynamic measurements, and is fully automatic.

Although a preferred embodiment of the invention has been described in detail, it is to be understood that various changes, substitutions and alterations could be made in the various components and subsystems, and in the arrangement and combination thereof, without departing from the spirit and scope of the invention as defined by the appended claims.

What is claimed is:

1. In a system for making electronic measurements on a multilead electronic test specimen, the test station comprising:

socket means for receiving an electronic test specimen having a plurality of leads, at least one power bus and at least one sense bus for each lead of the test specimen, first circuit means connecting each lead of the electronic test specimen through the socket means to a different power bus, second circuit means connecting each lead of the electronic test specimen through the socket means to a different sense bus, a plurality of power terminals for each power bus, a relay interconnecting each power terminal and the corresponding power bus for selectively connecting the power terminal to the respective power bus, a D.C. bias terminal connectable to a D.C. bias supply and disposed adjacent a plurality of the power terminals to facilitate the interconnection of the D.C. bias terminal and selected power terminals by circuit means specifically selected for the particular test specimen, a dynamic stimulus terminal connectable to the output of a pulse generator and disposed adjacent a plurality of the power terminals to facilitate the interconnection of the dynamic stimulus terminal and selected power terminals by circuit means specifically selected for the particular test specimen, a dynamic output, relay means for selectively connecting each of the sense buses to the dynamic output, a static output, relay means for selectively connecting each of the sense buses to the static output, the relays connected to the power buses being mechanically connected to a first mechanical circuit forming means on which the power buses are formed as printed circuits, the socket means being formed on a second mechanical circuit forming means which is connected to the first mechanical circuit forming means by plug-in electrical connectors, and the power terminals, the D.C. bias terminal and the dynamic power terminal being formed on a third mechanical circuit forming means and all circuits extending from the third mechanical circuit forming means to the second mechanical circuit forming means are completed through disconnectable connectors, whereby the second mechanical circuit forming means can be disconnected and replaced by another having a socket means thereon particularly adapted to receive a particular electronic test specimen, and the third mechanical circuit forming means can be removed and replaced by another mechanical circuit forming means on which the power terminals and the static bias supply terminal and the dynamic stimulus terminal are interconnected by jumper wires and loads for testing the particular electronic test specimen.

2. The combination defined in claim 1 wherein:

the sense buses are circuits formed on the first mechanical circuit forming means, the relays connecting the sense buses to the dynamic output and to the static output are mechanically connected to the first mechanical circuit forming means, and the dynamic output is a plug-in connector mechanically connected to the first mechanical circuit forming means and electrically connected by the relays to the sense buses.

3. The combination defined in cliam 2 wherein:

there are a plurality of dynamic outputs each of which is selectively connected to a plurality of sense buses by said relays.

References Cited

UNITED STATES PATENTS

| | | | |
|---|---|---|---|
| 3,034,051 | 5/1962 | Higgins | 324—73 |
| 3,219,927 | 11/1965 | Topp | 324—73 |
| 3,237,100 | 2/1966 | Chalfin | 324—73 |

R. V. ROBRIC, Primary Examiner

E. L. STOLARUN, Assistant Examiner

U.S. Cl. X.R.

324—51, 158